United States Patent [19]
Kawasaki et al.

[11] Patent Number: 5,825,939
[45] Date of Patent: Oct. 20, 1998

[54] PIXEL MODULATION CIRCUIT AND RECORDING APPARATUS USING THE SAME

[75] Inventors: Somei Kawasaki, Urawa; Masami Iseki, Yokohama; Hironari Ebata, Yamato, all of Japan

[73] Assignee: Canon Kabushiki Kaisha, Tokyo, Japan

[21] Appl. No.: 628,001

[22] Filed: Apr. 4, 1996

[30] Foreign Application Priority Data

Apr. 7, 1995 [JP] Japan .................................. 7-082497
Mar. 27, 1996 [JP] Japan .................................. 8-072198

[51] Int. Cl.[6] ........................................................ G06K 9/38
[52] U.S. Cl. ................................... 382/270; 358/455
[58] Field of Search ............................ 382/270; 358/455, 358/459, 298, 110, 107; 395/109, 110, 107; 347/131, 251, 254

[56] References Cited

U.S. PATENT DOCUMENTS 5,502,419  3/1996  Kawasaki .............................. 332/109

*Primary Examiner*—David K. Moore
*Assistant Examiner*—Hieu Le
*Attorney, Agent, or Firm*—Fitzpatrick, Cella, Harper & Scinto

[57] ABSTRACT

A pixel modulation circuit outputs a pulse signal having a pulse width corresponding to pixel data representing a gradation level of each pixel. The pixel modulation circuit comprises a first triangular pulse generating circuit for generating a periodic triangular pulse signal, a complement and antilog output circuit capable of outputting a level signal corresponding to both antilog and complement values of pixel data, and a comparison circuit for comparing the triangular pulse signal with the level signal.

24 Claims, 26 Drawing Sheets

ORIGINAL IMAGE

CENTRAL GROWTH

FIG. 7
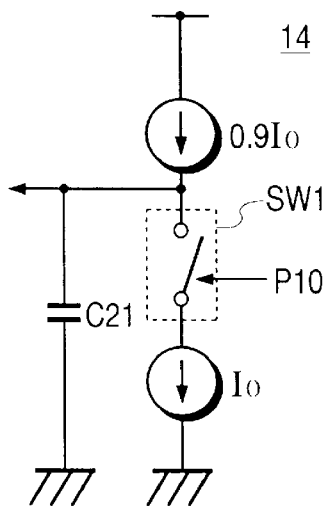
FIG. 8
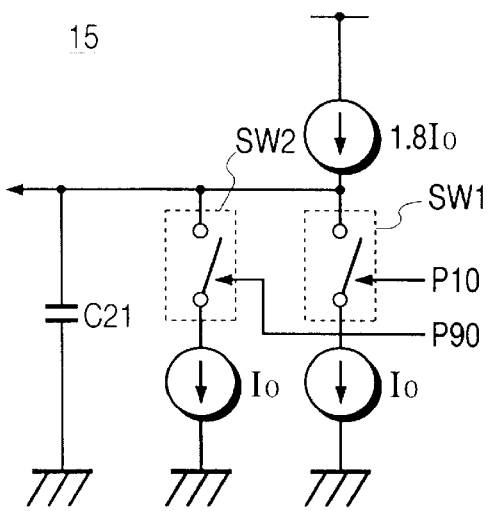
FIG. 9
| | R | DOUBLE PIXEL CLOCK | | | |
|---|---|---|---|---|---|
| | | ODD NUMBER PIXEL (1) | | EVEN NUMBER PIXEL (0) | |
| LEFT GROWTH | 0 | COMPLEMENT | NEGATIVE POLARITY | ANTILOG | POSITIVE POLARITY |
| RIGHT GROWTH | 1 | ANTILOG | POSITIVE POLARITY | COMPLEMENT | NEGATIVE POLARITY |

FIG. 10A
RIGHT AND LEFT GROWTH
FIG. 10B
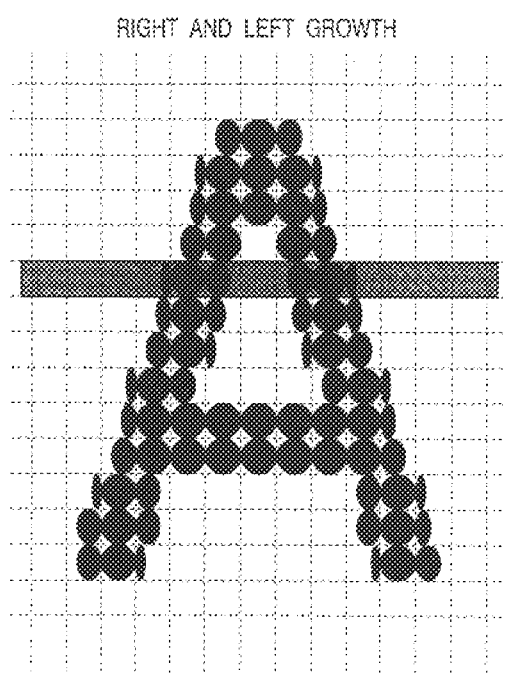
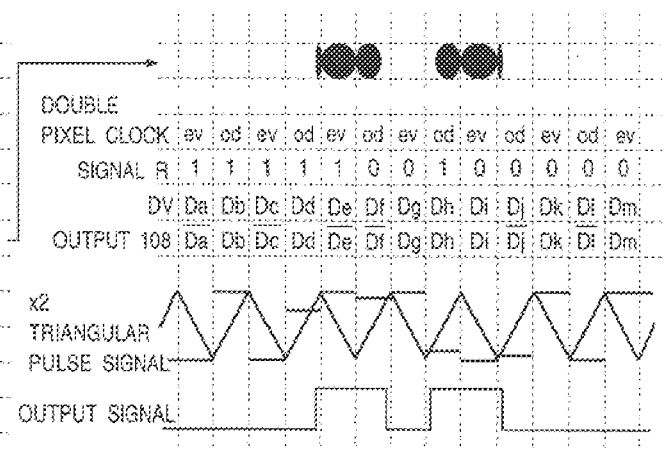

| | LR | R | DOUBLE PIXEL CLOCK | | ×1/×2 |
| | | | ODD NUMBER PIXEL (1) | EVEN NUMBER PIXEL (0) | |
|---|---|---|---|---|---|
| CENTRAL GROWTH | 0 | 0 | ANTILOG | ANTILOG | ×1 |
| BOTH ENDS GROWTH | 0 | 1 | COMPLEMENT | COMPLEMENT | ×1 |
| LEFT GROWTH | 1 | 0 | COMPLEMENT | ANTILOG | ×2 |
| RIGHT GROWTH | 1 | 1 | ANTILOG | COMPLEMENT | ×2 |

RIGHT AND LEFT GROWTH + CENTRAL GROWTH od: ODD NUMBER PIXEL
ev: EVEN NUMBER PIXEL

PIXEL MODULATION CIRCUIT AND RECORDING APPARATUS USING THE SAME

BACKGROUND OF THE INVENTION

1. Field of the Invention

The present invention relates to a pixel modulation circuit for receiving pixel data and pulse-width modulating the data, and a recording apparatus using the same.

2. Related Background Art

For example, a pixel modulation circuit like the one shown in FIG. 1 is used in an LBP (laser beam printer) or copying machine which prints video image information.

FIG. 1 is a block diagram showing an example of the arrangement of a PWM pixel modulation circuit, which is designed to obtain a pulse signal having the same period as that of an input clock signal SCK and a pulse width which changes from the center of one period of the clock signal SCK in accordance with input data.

A pixel clock (SCK) is a clock signal for defining a pixel print position which is synchronized with respect to the lateral position of the paper surface. This clock SCK is input to a triangular pulse generating circuit 1. The triangular pulse generating circuit 1 generates a triangular pulse signal TRI (FIG. 2C) synchronized with the clock SCK, and outputs it to a comparator 2. The triangular pulse generating circuit 1 may be a time constant circuit. In order to obtain a triangular pulse signal having a sufficient amplitude and good linearity, a clock signal having a large amplitude must be input.

Meanwhile, a D/A converter (antilog DAC) 4 latches pixel data D8 to D1 representing the gradation levels of pixels in response to a pixel clock SCK, and outputs pixel modulation data LE having undergone analog conversion like the one shown in FIG. 2C. This data is input to the comparator 2. The comparator 2 outputs a pulse signal whose pulse width is controlled in accordance with the data D8 to D1 in FIG. 2C. In order to reproduce pixels Da, Db, . . . , Dm, a laser beam scanned by using a rotating polygon mirror is irradiated on a photosensitive member surface while this pulse signal is generated. With an electrophotographic technique, since toner adheres to the laser irradiation area, image can be expressed with gradation, thereby reproducing a video image.

In general, print information often includes both character information and a video image (with gradation).

FIG. 2A shows an example of character information which is drawn with a limited number of pixels. The above pixel modulation data D8 to D1 can be obtained by photoelectrically converting such an image using an image scanner or the like. When this image is to be reproduced on a paper surface by using the pixel modulation circuit in FIG. 1, the size of each pixel is controlled from the pixel center. As shown in FIG. 2B, only character information with poor contour expression and sharpness can be reproduced. This poses a great problem in a monochrome copying machine attaching great importance to character information and a printer for printing a text image (characters and graphic patterns) sent from a host computer.

SUMMARY OF THE INVENTION

It is an object of the present invention to provide an image modulation circuit and a recording apparatus which can solve the above technical problems and improve the character image contour reproduction performance with a simple arrangement.

In order to achieve the above object, according to the present invention, there is provided a pixel modulation circuit for outputting a pulse signal having a pulse width corresponding to pixel data representing a gradation level of each pixel, comprising a first triangular pulse generating circuit for generating a periodic triangular pulse signal, a complement and antilog output circuit capable of outputting a level signal corresponding to both antilog and complement values of pixel modulation data, a comparison circuit for comparing the triangular pulse signal with the level signal, and a polarity switching circuit for switching a polarity of an output signal from the comparison circuit.

According to the present invention, with the addition of simple arrangements such as a complement and antilog switching circuit and a polarity switching circuit, a pulse having a pulse width corresponding to a gradation level can be output at a timing corresponding to the central position of one pixel, the right side thereof, or the left side thereof with respect to the scanning direction.

BRIEF DESCRIPTION OF THE DRAWINGS

FIG. 7 is a circuit diagram showing an example of the arrangement of a CP 14 in FIG. 5;

FIG. 8 is a circuit diagram showing an example of the arrangement of a CP 15 in FIG. 5;

FIG. 9 is a view for explaining the selection forms of switching circuits 106 and 108;

FIGS. 10A and 10B are views for explaining an image recording operation using the circuit in FIG. 5;

FIG. 13 is a circuit diagram showing an example of the arrangement of a triangular pulse generating circuit 102a;

DETAILED DESCRIPTION OF THE PREFERRED EMBODIMENTS

The preferred embodiments of the present invention will be described in detail below with reference to the accompanying drawings.

Figure 3:
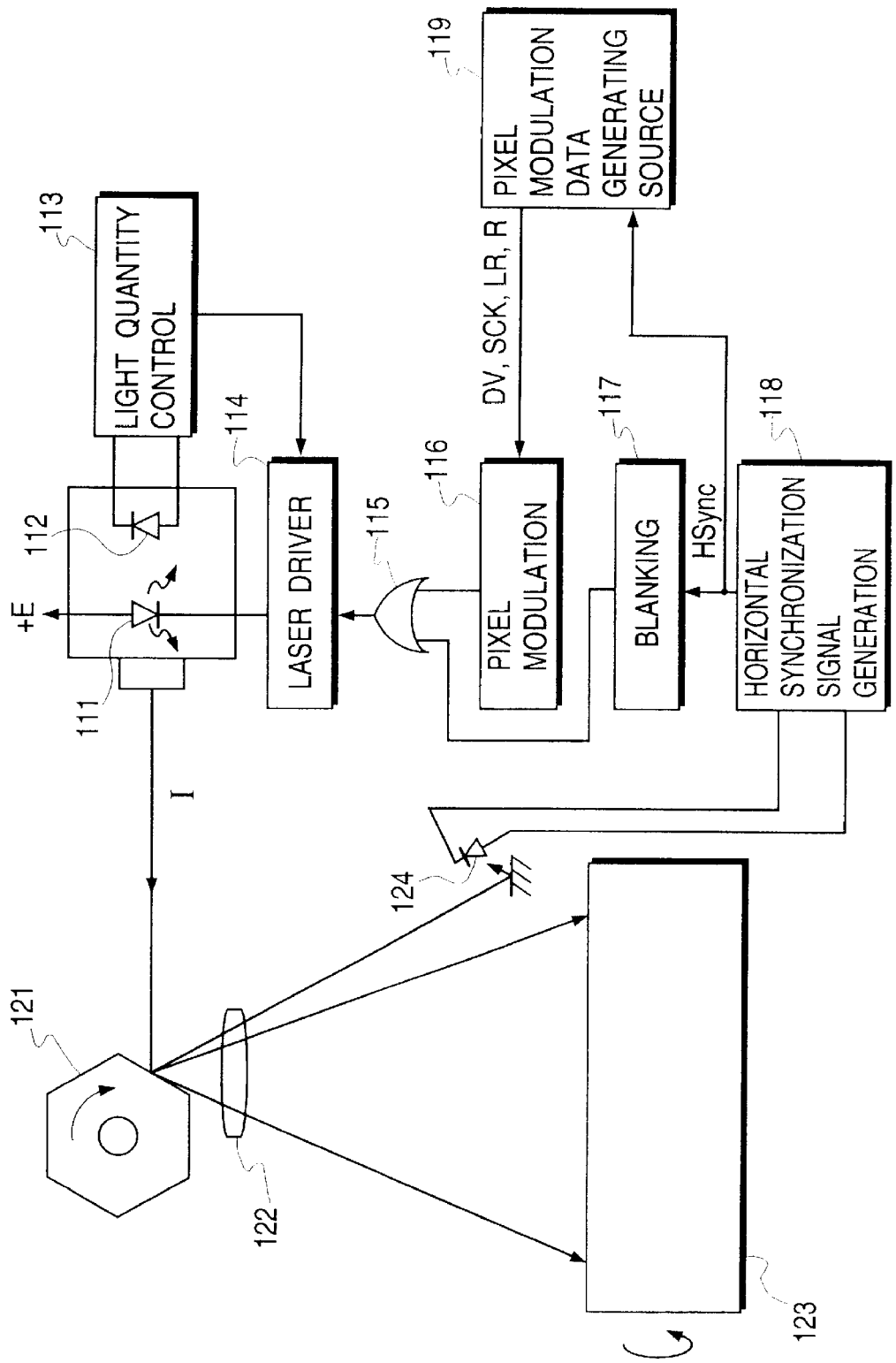
FIG. 3 is a block diagram showing a recording apparatus to which the present invention is applied.

FIG. 3 shows an embodiment of a laser beam printer to which the present invention is applied. This printer includes a semiconductor laser 111 as a laser source, a photodiode 112 for monitoring a laser beam emitted from the semiconductor laser 111, and a light quantity control unit 113 for controlling the current supplied to the semiconductor laser 111 on the basis of the monitored light quantity. The light quantity control unit 113 controls the current such that an output from the photodiode 112 becomes a predetermined value.

A polygon mirror 121 deflects a laser beam I emitted from the semiconductor laser 111. The polygon mirror 121 is fixed to a motor shaft (not shown) to be rotated in the direction indicated by the arrow in FIG. 3 so as to scan the beam I on a photosensitive drum 123. An f-θ lens 122 focuses the deflected laser beam I on the photosensitive drum 123.

A beam detector 124 is constituted by a light-receiving diode for detecting a position on the photosensitive drum 123 at which writing of information is to be started using the laser beam I. A horizontal synchronization signal generating circuit 118 generates a horizontal synchronization signal Hsync on the basis of an output from the beam detector 124.

On the basis of the horizontal synchronization signal, a blanking circuit 117 generates an unblanking signal UNBL for turning on the semiconductor laser 111 at the timing at which the beam detector 124 is to detect the laser beam I next, and supplies the signal to an OR circuit 115.

The OR circuit 115 also receives a pulse-width-modulated image signal supplied from a pixel modulation circuit 116. An output from the OR circuit 115 is supplied to a laser driver 114. With this operation, the current set by the light quantity control unit 113 is supplied to the semiconductor laser 111.

Note that a pixel modulation data generating source 119 outputs pixel modulation data representing a pixel gradation level using, e.g., eight bits in synchronism with a pixel clock which is generated in synchronism with the horizontal synchronization signal Hsync.

The first to seventh embodiments each used as the above pixel modulation circuit 116 will be described in detail below.

First Embodiment

Figure 4:
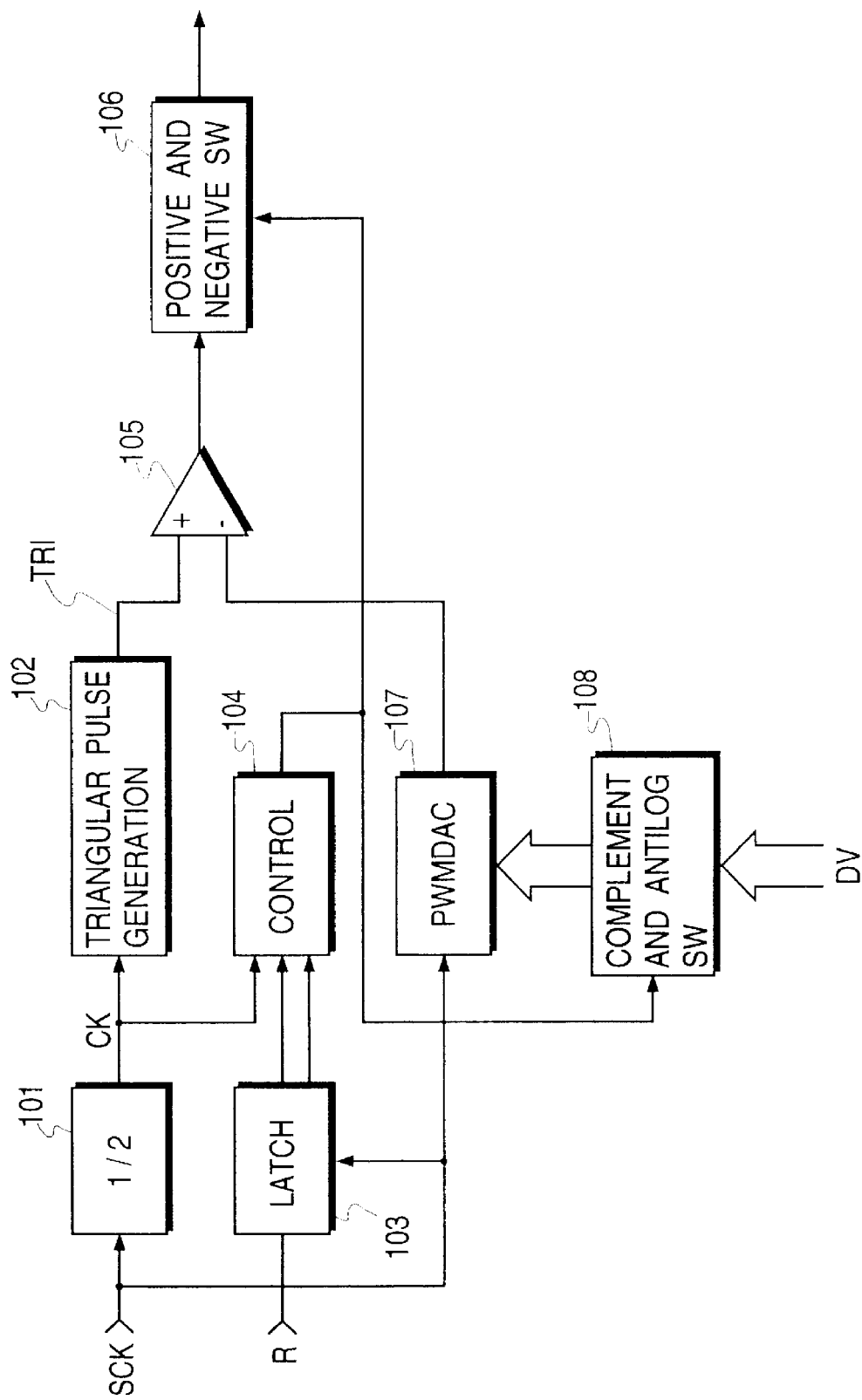
FIG. 4 is a block diagram showing the first embodiment of the present invention.

FIG. 4 shows a pixel modulation circuit according to the first embodiment of the present invention. For example, this circuit can be used as the pixel modulation circuit 116 in FIG. 3.

A pixel clock SCK is input to a frequency two parts dividing circuit 101 to be converted into a double pixel clock. This clock is input to a triangular pulse generating circuit 102. The triangular pulse generating circuit 102 generates a triangular pulse signal TRI having a two-pixel period, and outputs it to a comparator 105.

Figure 5:
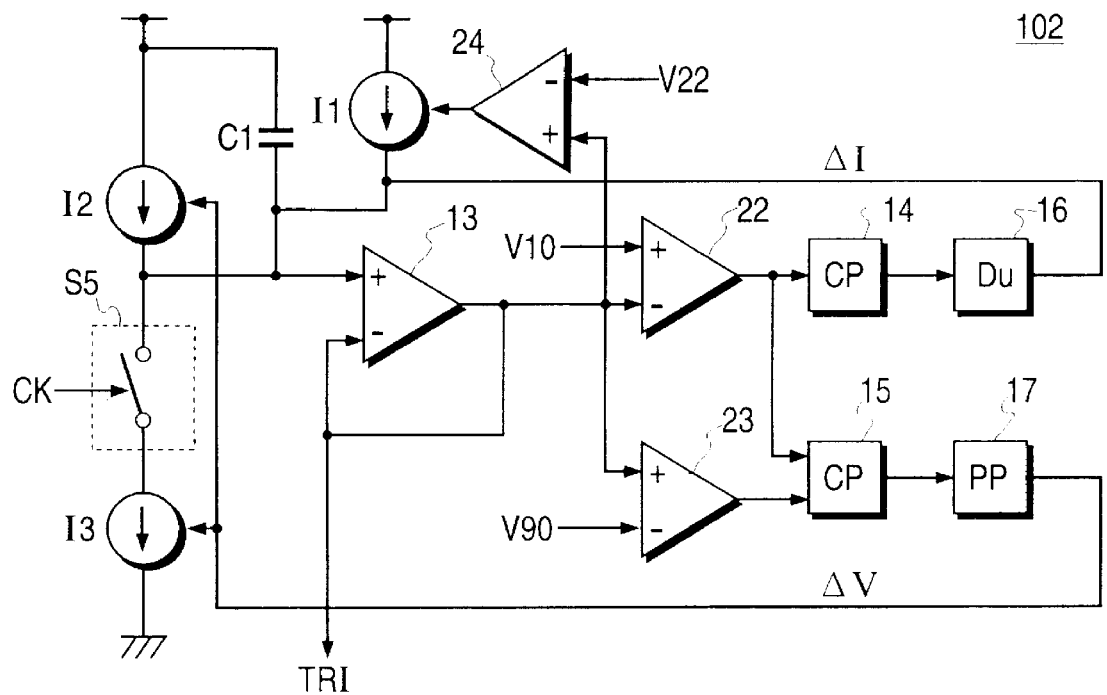
FIG. 5 is a block diagram showing an example of the arrangement of a triangular pulse generating circuit.

FIG. 5 is a block diagram showing an example of the arrangement of a triangular pulse generating circuit 102 in FIG. 4. This circuit comprises comparators 22 to 24, a buffer 13, charge pumps (CPs) 14 and 15, error signal generating circuits (Du, PP) 16 and 17, a capacitor C1, and current sources I1 to I3. Signals V10, V90, and V22 input to the comparators 22 to 24 are the same as those shown in FIGS. 2A to 2C. A signal CK for opening/closing a switch S5 is an output from the frequency two parts dividing circuit 101 in FIG. 4.

Clock signals CK having the same duty, which are obtained by ½-frequency-dividing the clock SCK, are used to open/close the switch S5 in FIG. 5 to charge/discharge the capacitor C1 with the currents I2 and I3, thereby obtaining a triangular pulse. Note that the current I3 is set to 2·I2. However, the triangular pulse TRI obtained in this manner does not always have a desired peak value depending on variations in internal elements and the like. For this reason, the comparators 22 and 23 compare the level of the triangular pulse TRI with the levels of the signals V10 and V90 which have levels 10% to 90% of the desired peak value.

Figure 6:
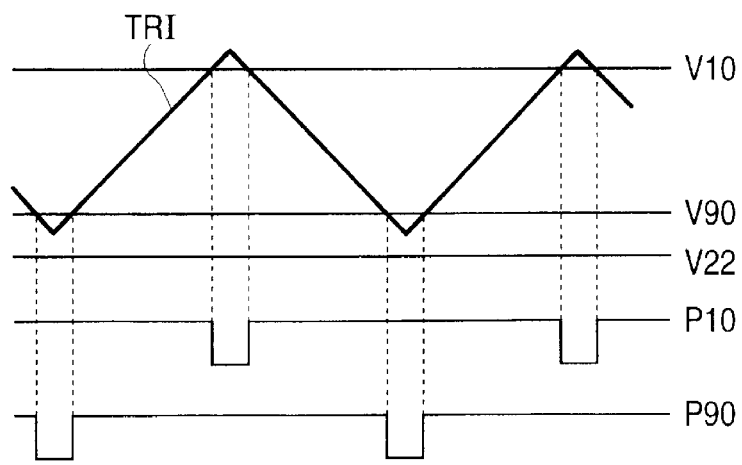
FIG. 6 is a timing chart showing triangular pulses TRI, V10, and V90 and comparison results P10 and P90 in FIG. 5.

FIG. 6 shows the triangular pulses TRI, V10, and V90 and comparison results P10 and P90 obtained by the comparators 22 and 23. A signal P10 is input to the CP 14 in FIG. 7. The CP 14 stabilizes only when the duty of the signal P10 is controlled to be 9:1 by using a current source I0 and a current source 0.9·I0. The Du 16 generates an error current ΔI in accordance with an output from the CP 14. By feeding back the error current ΔI to the capacitor C1, the duty of the triangular pulse TRI, i.e., its offset value, is controlled.

The signal P90 obtained by the comparator 23 is input to the CP 15 in FIG. 8 together with the signal P10. The CP 15 stabilizes only when both the duties of the signals P10 and P90 are controlled to become 9:1 by using a current source 1.8·I0 and a current source I0. The PP 17 generates an error voltage ΔV in accordance with an output from the CP 15. By controlling the current sources I2 and I3 using the error voltage ΔV, the peak value of the triangular pulse TRI is controlled.

The comparator 24 for comparing the signal V22 in FIG. 5 with the triangular pulse TRI serves as a starting circuit for quickly converging a triangular pulse upon generation thereof, and a jitter correction circuit for correcting the jitter of an output signal by locking the triangular pulse TRI to its lower peak value for every period. Note that this signal V22 is set to a level at which the triangular pulse TRI is not disturbed.

As described above, by using the triangular pulse generating circuit 102 in FIG. 5, a stable triangular pulse TRI can be obtained. A PWM output can be obtained by comparing this stable triangular pulse RTI with an analog signal obtained by D/A conversion of input data D8 to D1.

Figure 1:
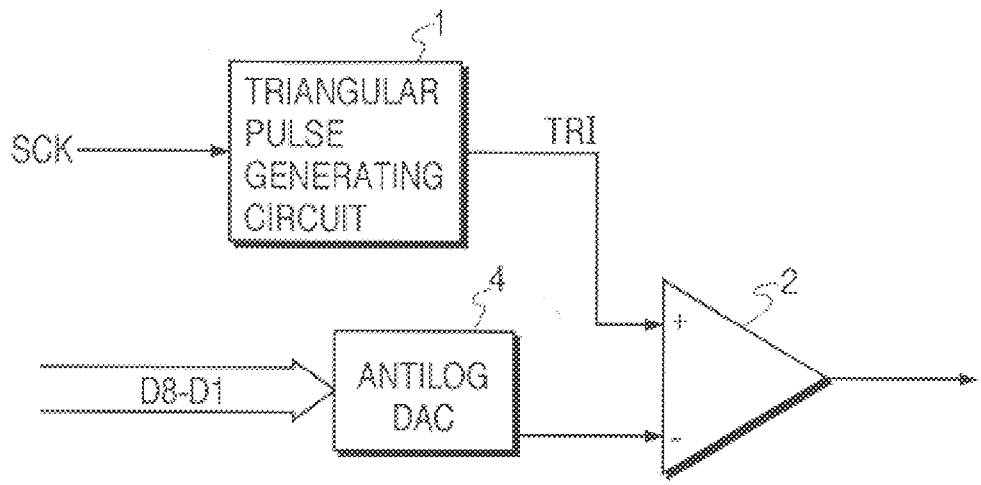
FIG. 1 is a block diagram showing the arrangement of a conventional PWN modulation circuit.

Pixel modulation data DV is input to a D/A converter 107 via a complement and antilog SW circuit 108 capable of converting data into a complement value. An output from the D/A converter 107 is input to the comparator 105, in which the level of the output is compared with that of the triangular pulse signal TRI. With this operation, a pulse signal pulse-width-controlled with the pixel modulation data DV is output as in the prior art in FIG. 1. This pulse signal is output via a positive and negative SW circuit 106 capable of controlling the polarity of the pulse signal.

The operations of the complement and antilog SW circuit 108 and the positive and negative SW circuit 106 described above are controlled by a control circuit 104 on the basis of a right growth mode signal R supplied from the pixel modulation data generating source 119. These operations will be described below.

The right growth mode signal R is latched by a latch circuit 103 in response to a pixel clock SCK and input to the control circuit 104. The control circuit 104 specifies a pulse width control method for an output pulse signal to be a left or right growth mode in units of pixels by using the signal R. The above double pixel clock is also input to the control circuit 104. The double pixel clock specifies a pixel clock number as an odd/even number using, e.g., logic "1"/"0". The control circuit 104 controls the pixel modulation data DV and the output pulse signal polarity in accordance with the control method specified by the signal R in unit of printed pixels to generate printed pixels in the left or right growth mode, as shown in FIG. 9.

More specifically, the control circuit 104 switches the logics of signals to be output to the complement and antilog SW circuit 108 and the positive and negative SW circuit 106 in accordance with the logics of the signal R and the double pixel clock. With this operation, the complement and antilog SW circuit 108 outputs the input data without any change (antilog) or upon conversion into a complement, and the positive and negative SW circuit 106 outputs the input signal without changing its polarity (positive) or upon changing the polarity (negative).

Figure 2A:
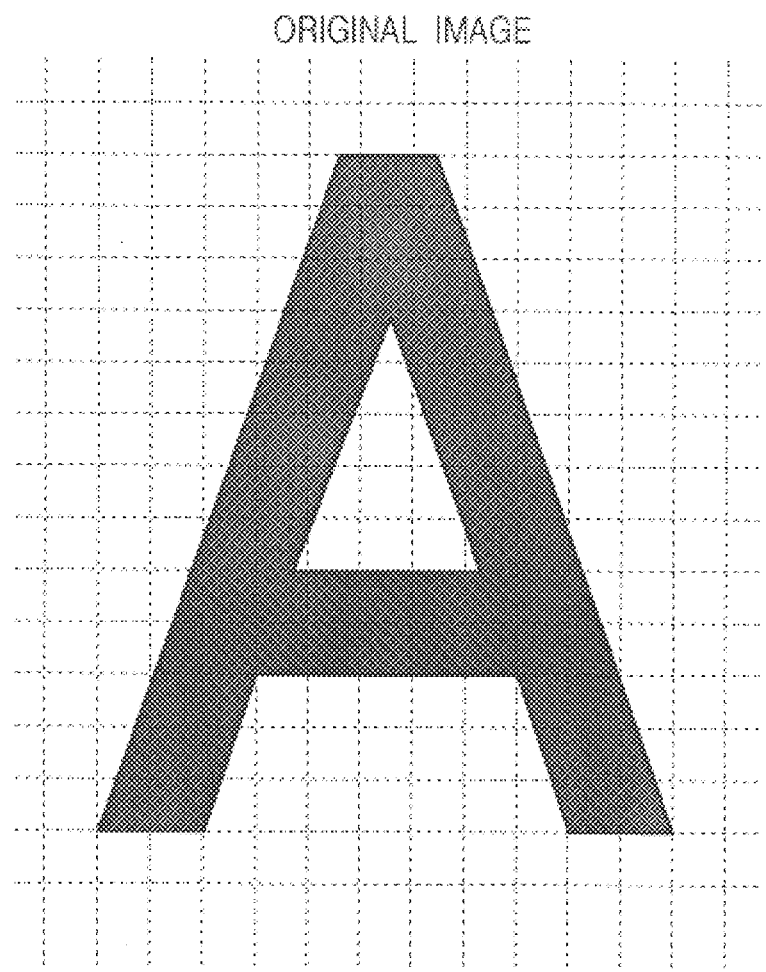
FIGS. 2A to 2C are views for explaining an image recording operation using the circuit in FIG. 1.

FIG. 10A shows an output sample obtained by using the above pixel modulation circuit for the pixel modulation data corresponding to the image shown in FIG. 2A. In this embodiment, for example, the R signal is output in the following manner in accordance with the difference in gradation level between right and left pixels adjacent to the pixel of interest:

(1) If left pixel>right pixel, then the R signal is switched to "1".

(2) If right pixel>left pixel, then the R signal is switched to "0".

FIG. 10B shows signals corresponding to the one scanning line in FIG. 10A.

Figure 2B:
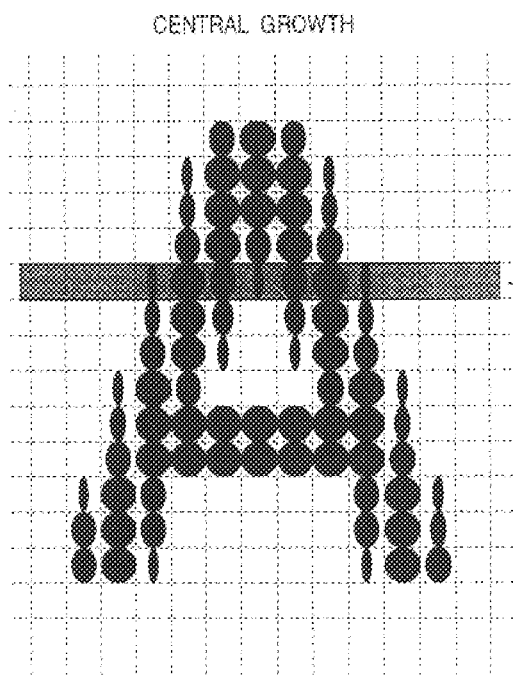
Figure 2C:
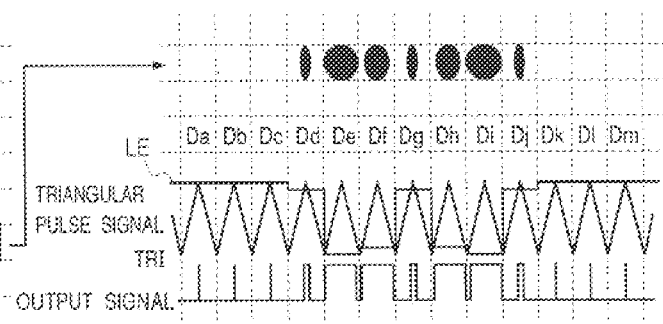

As is apparent from FIG. 10A, the boundary portions of the image are sharper than those in FIG. 2B.

Second Embodiment

Figure 11:
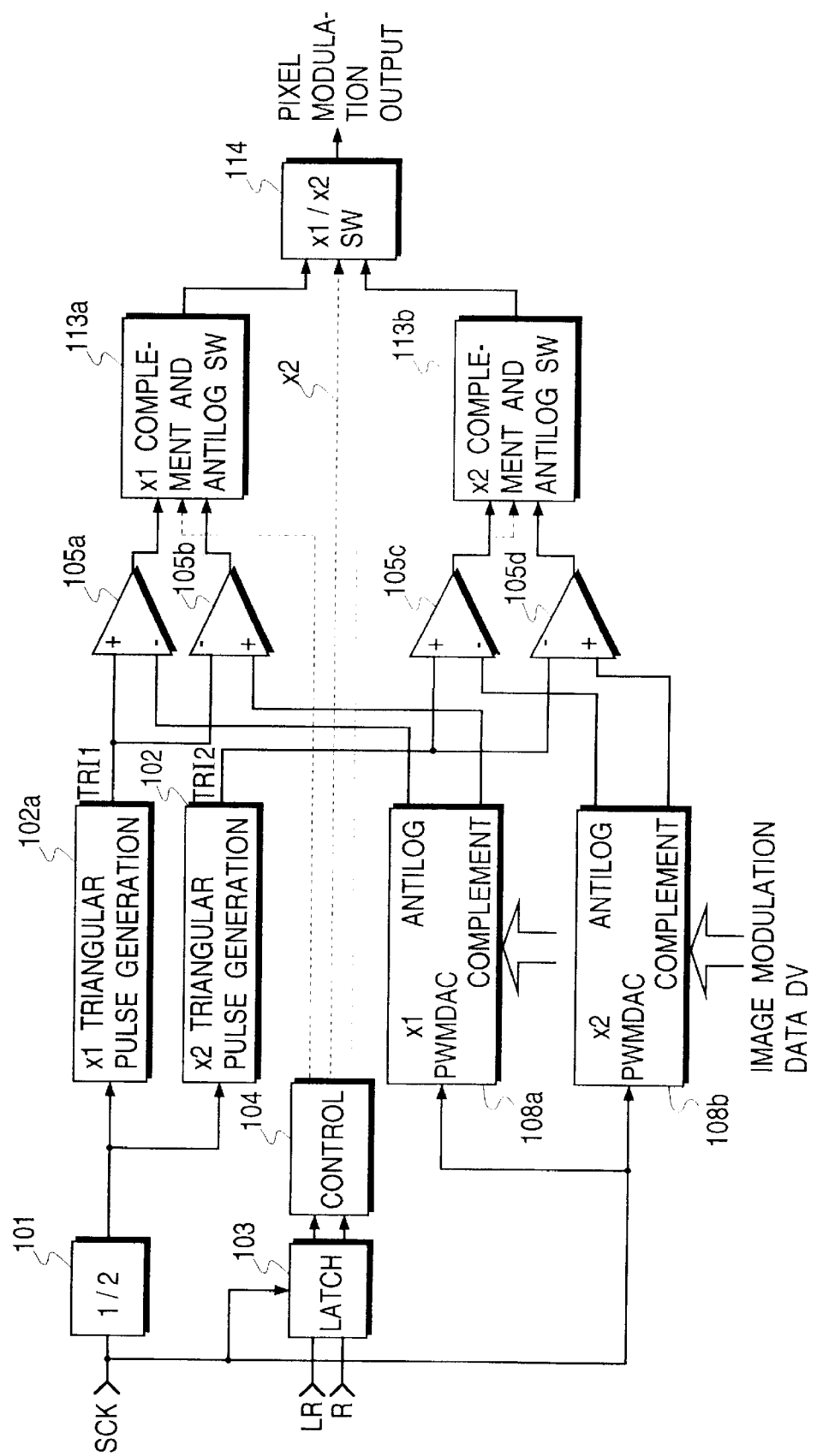
FIG. 11 is a block diagram showing the second embodiment of the present invention.

FIG. 11 shows a pixel modulation circuit according to the second embodiment of the present invention.

The differences between the first and second embodiments will be mainly described below.

Figure 12:
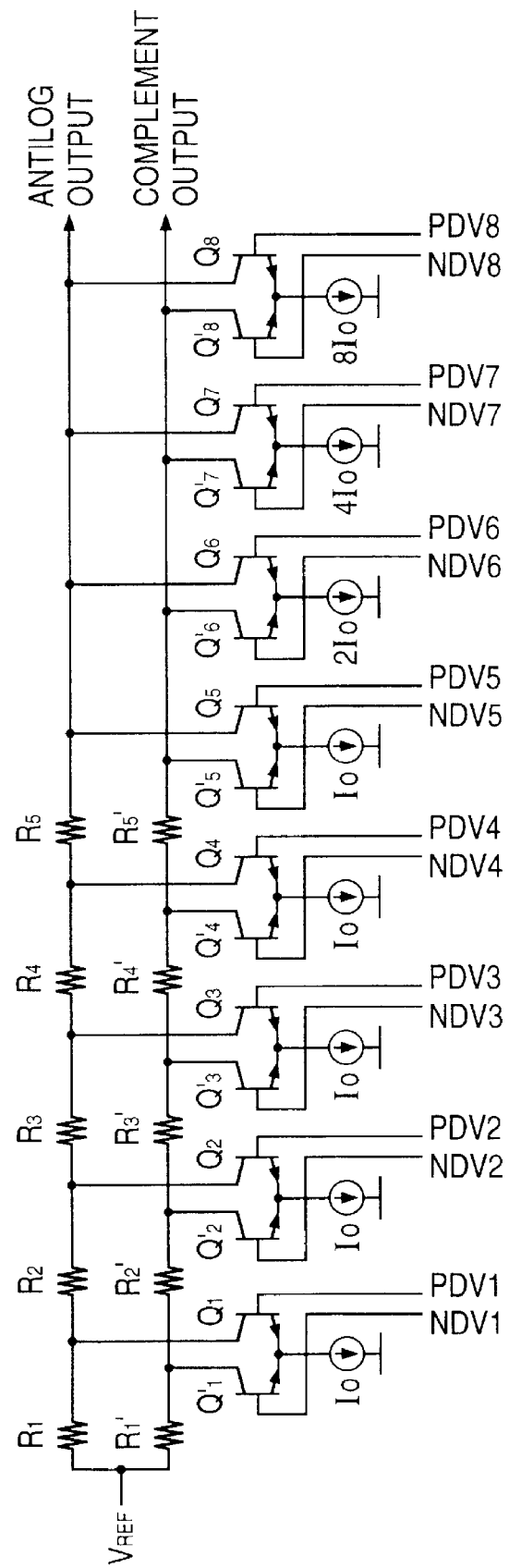
FIG. 12 is a circuit diagram showing an example of the arrangement of a PWMDAC 108.

D/A converters 108a and 108b for D/A-converting pixel modulation data DV have complement outputs in addition to antilog outputs. FIG. 12 shows an example of the arrangement of each of the D/A converters 108a and 108b. In this example, a block of resistors R1' to R5' is added to the arrangement of a general high-speed D/A converter circuit to have a complement output.

Antilog pixel modulation analog data from the D/A converters 108a and 108b are respectively supplied to the inverting input terminals of comparators 105a and 105c. Complement pixel modulation analog data from the D/A converters 108a and 108b are respectively supplied to the non-inverting input terminals of comparators 105b and 105d.

Figure 13:
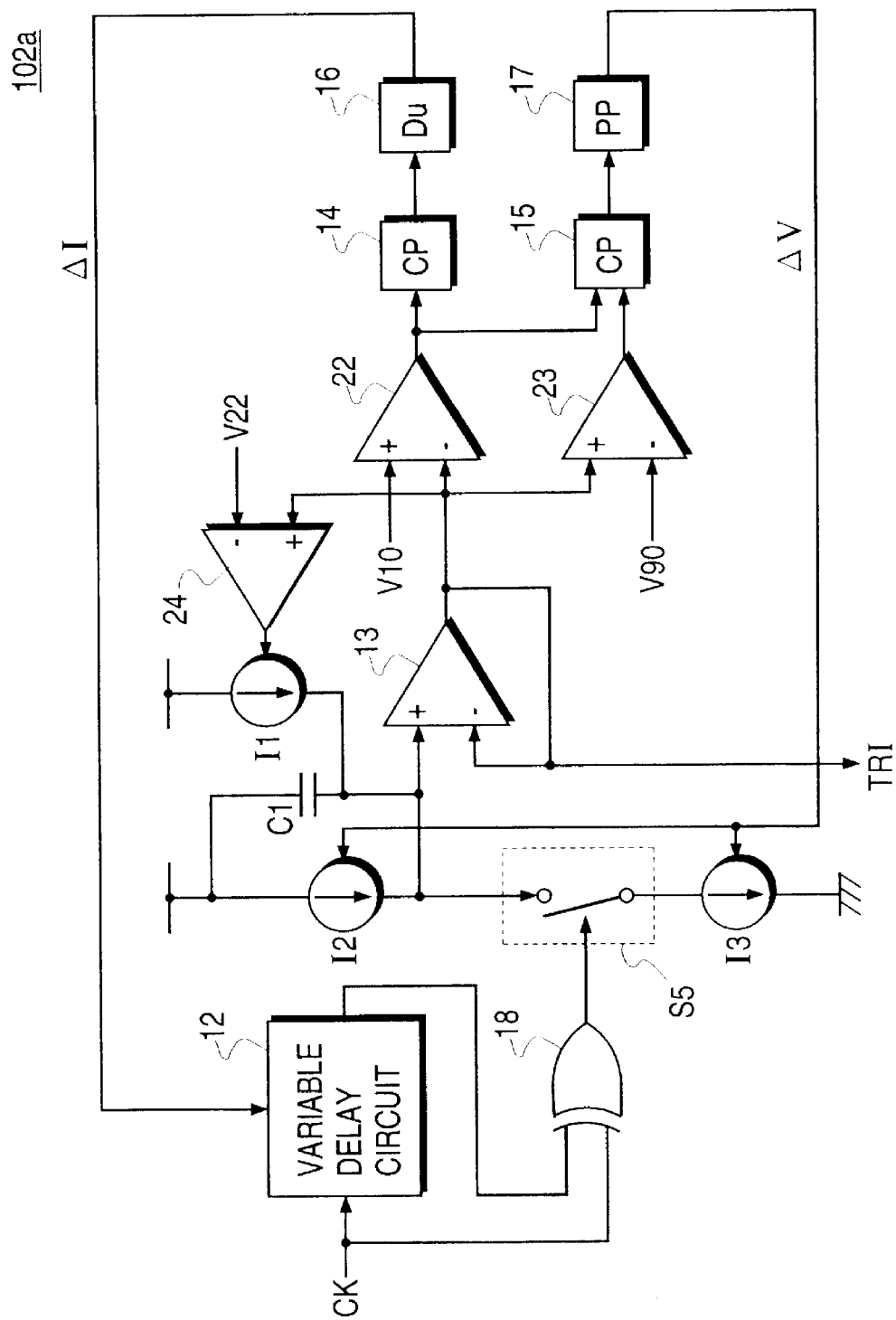

In this embodiment, a double pixel clock is input to two triangular pulse generating circuits 102 and 102a. The triangular pulse generating circuit 102a generates a one-period triangular pulse signal per pixel. FIG. 13 shows an example of the arrangement of the triangular pulse generating circuit 102a. The triangular pulse generating circuit 102a is partly similar to the triangular pulse generating circuit 102 described above. The same reference numerals in these circuits denote the same parts, and a detailed description thereof will be omitted.

The triangular pulse generating circuit 102a comprises comparators 22 to 24, a buffer 13, charge pumps (CPs) 14 and 15, error signal generating circuits (Du, PP) 16 and 17, a capacitor C1, and current sources I1 to I3.

In the triangular pulse generating circuit 102, a clock SCK is ½-frequency-divided by a frequency two parts dividing circuit 101 to obtain a signal CK whose duty is 50% that of the clock SCK, and the signal CK is delayed by a variable delay circuit 12, which has a delay amount of T0/2 with respect to a period T0 of the clock SCK, by T0/2. The ½-frequency-divided signal CK and the delayed signal are EXORed by an EXOR circuit 18. With this operation, a signal having the same period as that of the clock SCK and a predetermined duty can be obtained.

Figure 14:
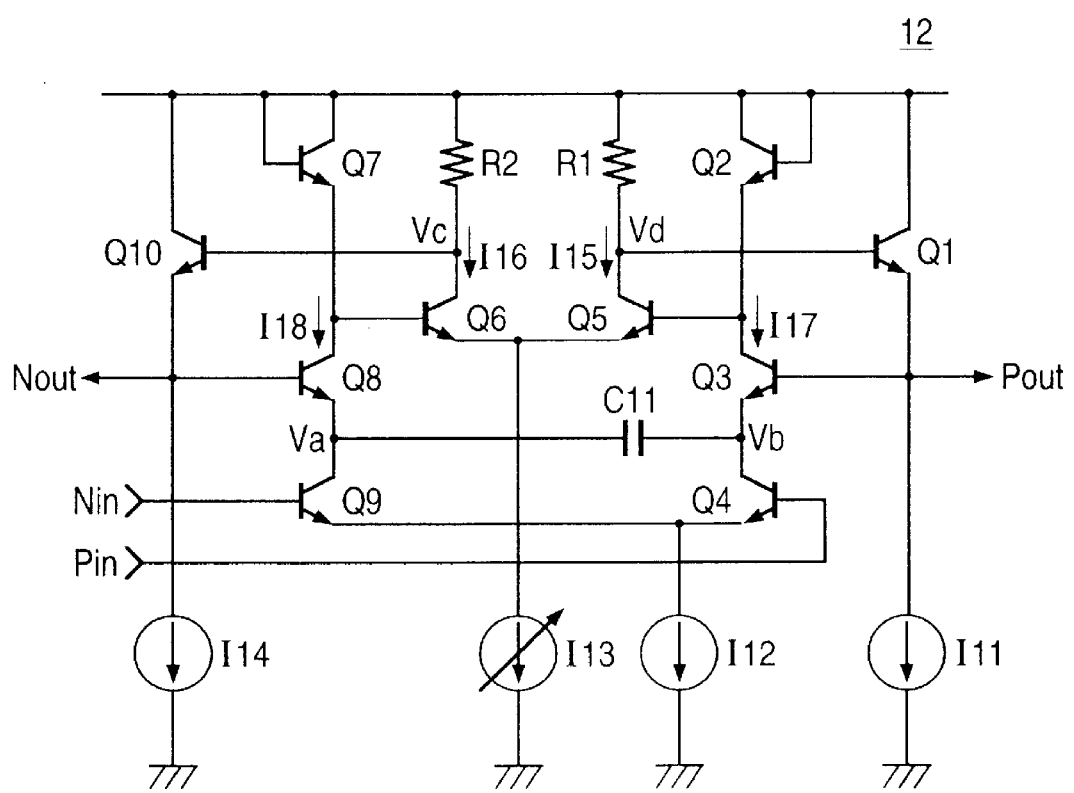
FIG. 14 is a circuit diagram showing an example of the arrangement of a variable delay circuit in FIG. 13.
Figures 15, 16:
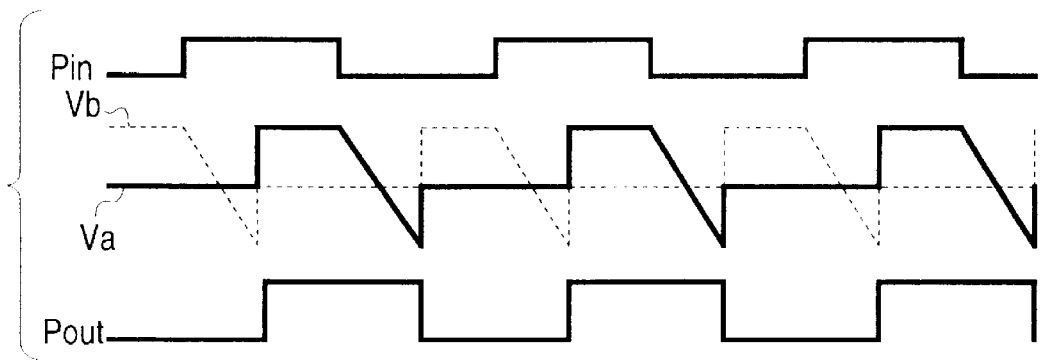
FIG. 15 is a timing chart showing the waveforms of signals in the variable delay circuit in FIG. 14.
FIG. 16 is a view showing the selection forms of switching circuits 113a, 113b, and 114.

FIG. 14 is a circuit diagram showing an example of the arrangement of the variable delay circuit 12. FIG. 15 shows the waveforms of signals in the variable delay circuit 12. R1=R2=R, and I11–I14. A delay amount ΔT is determined by the following equation:

$$\Delta T = R \cdot C11 \cdot I13/I12 \tag{1}$$

In this circuit, when inputs Pin and Nin are at H level and L level, respectively, transistors Q9 and Q8 are OFF, and a current I13 flows via a resistor R2 and a transistor Q6. A transistor Q10 is therefore OFF, and an output Nout is at L level. On the other hand, since a current I12 flows via transistors Q2, Q3, and Q4, and a transistor Q5 is OFF, a transistor Q1 is turned on to set an output Pout at H level. At this time, an emitter voltage Vb of the transistor Q3 is fixed to a potential lower than the potential of the output Pout by a base-emitter voltage Vbe.

When the polarities of the inputs Pin and Nin are inverted, the transistors Q9 and Q4 are respectively turned on and off, and a current I12 flows from a capacitor C11 via the transistor Q9 at first. An emitter potential Va of the transistor Q8 gradually lowers. When the potential Va lowers to a potential lower than the potential of the output Nout by the potential Vbe, a current begins to flow in the transistor Q8. A collector current I16 in the transistor Q6 decreases, and a collector potential Vc of the transistor Q6 rises accordingly. When the collector potential Vc rises, the transistor Q10 is turned on to set the output Nout at H level. In addition, the base current in the transistor Q8 increases, and the collector current in the transistor Q8 further increases. Assuming that r1 and r2 be the emitter internal resistances of the transistors Q5 and Q6, the transistor Q16 is turned off when R/(r1+r2) =1.

When the transistor Q6 is turned off, a current I13 flows via the resistor R1 and the transistor Q5, and a collector potential Vd of the transistor Q5 lowers. Consequently, the transistor Q1 is turned off to set the output Pout at L level, and the transistor Q3 is turned off. As a result, the current C11 stops flowing.

As the potential of the output Nout rises, the potential Va quickly rises by a voltage Vx (=R·I16). In addition, since the transistors Q3 and Q4 are OFF, the potential Vb also rises by the voltage Vx, and the potentials Va and Vb do not change until the polarities of the inputs Pin and Nin are inverted again.

By repeating such an operation, a signal delayed by ΔT with respect to an input signal is output from the variable delay circuit 12. If the value of the voltage Vx is set to be large, the influence of the potential Vbe on the transistors Q1, Q3, Q8, and Q10 can be reduced. However, a longer time is required to invert the inputs Pout and Nout. Therefore, the circuit must be designed in consideration of these factors.

Furthermore, an accurate delay amount ΔT can be obtained as follows. An error signal is externally input to the variable delay circuit 12. The value of the current I13 is controlled by this error signal to control the value of the voltage Vx.

A triangular pulse signal whose one period corresponds to one pixel is supplied from the triangular pulse generating circuit 102a to the non-inverting input terminal of the comparator 105a and the inverting input terminal of the comparator 105b. A triangular pulse whose one period corresponds to two pixels is supplied from the triangular pulse generating circuit 102 to the non-inverting input terminal of the comparator 105c and the inverting input terminal of the comparator 105d.

Outputs from the comparators 105a and 105b are supplied to an x1 complement and antilog SW 113a. Outputs from the comparators 105c and 105d are supplied to an x2 complement and antilog SW 113b.

Outputs from the complement and antilog SWs 113a and 113b are input to an x1/x2 SW circuit 114.

With the above arrangement, a function of performing central growth control of the pixel size in units of pixels can be realized in addition to the function in the first embodiment.

Figure 17A:
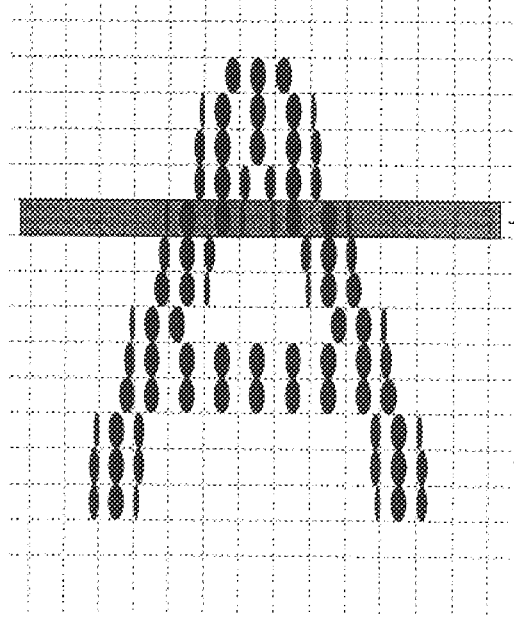
FIGS. 17A and 17B are views for explaining an image recording operation using the circuit in FIG. 13.

According to this embodiment, if the character "A" in FIG. 2A is a halftone image, the character can also be expressed in the manner shown in FIG. 17A.

In this embodiment, a control circuit 104 outputs signals for controlling the switches 113a, 113b, and 114 on the basis of the LR signal, the R signal, and the BW double pixel clock from an external device. FIG. 16 shows the logics of the LR signal, the R signal, and the double pixel clock in correspondence with the controlled states of the switches 113a, 113b, and 114.

Figure 17B:
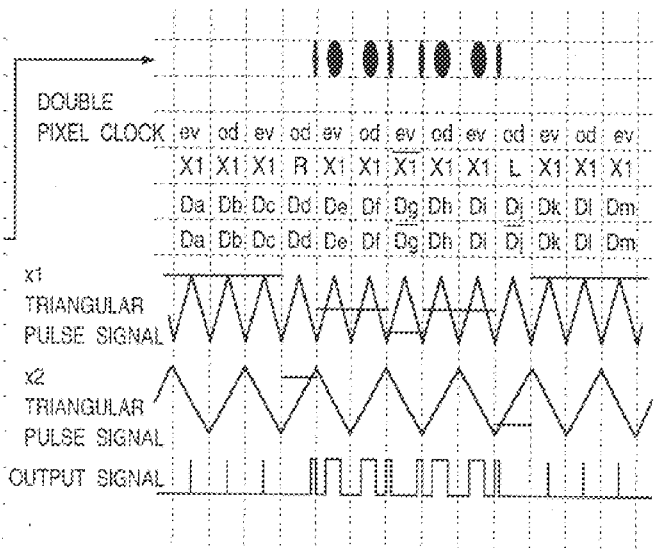

FIG. 17B shows how one line in FIG. 17A is modulated. In this case, the LR and R signals are output in the following manner:

(1) If the right pixel adjacent to a pixel of interest is "white", then LR signal="1", and R signal="0".
(2) If the left pixel adjacent to the pixel of interest is "white", then LR signal="1", and R signal="0".
(3) If the gradation level of the pixel of interest is lower than that of each of the right and left pixels, then LR signal="0", and R signal="1".
(4) In a case other than ① to ③, LR signal="0", and R signal="0".

In the second embodiment described above, if the triangular pulse generating circuit 102a, the D/A converter 108a, the comparators 105a and 105b, and the switch 114 are omitted, the same operation as that of the circuit of the first embodiment can be performed. The comparator 105b (105d) may be omitted, and the switch 106 in the first embodiment may be used in place of the switch 113a (113b). Alternatively, the D/A converter 107 and the switch 108 in the first embodiment may be used in place of the converter 108a (108b).

As described above, according to the first and second embodiments, the image modulation circuits can easily perform right and left growth control of pixels as well as central growth control of pixels, and so the character image contour reproduction performance can be improved in particular.

Since right and left growth control is performed by using a triangular pulse signal based on a single time constant, a good balance between right and left growth characteristics can be easily maintained.

In addition, if each pixel modulation circuit includes a D/A converter having complement and antilog outputs, the above effects can be realized with a simpler arrangement.

Furthermore, the halftone character image reproduction performance can be improved.

Third Embodiment

Figure 18:
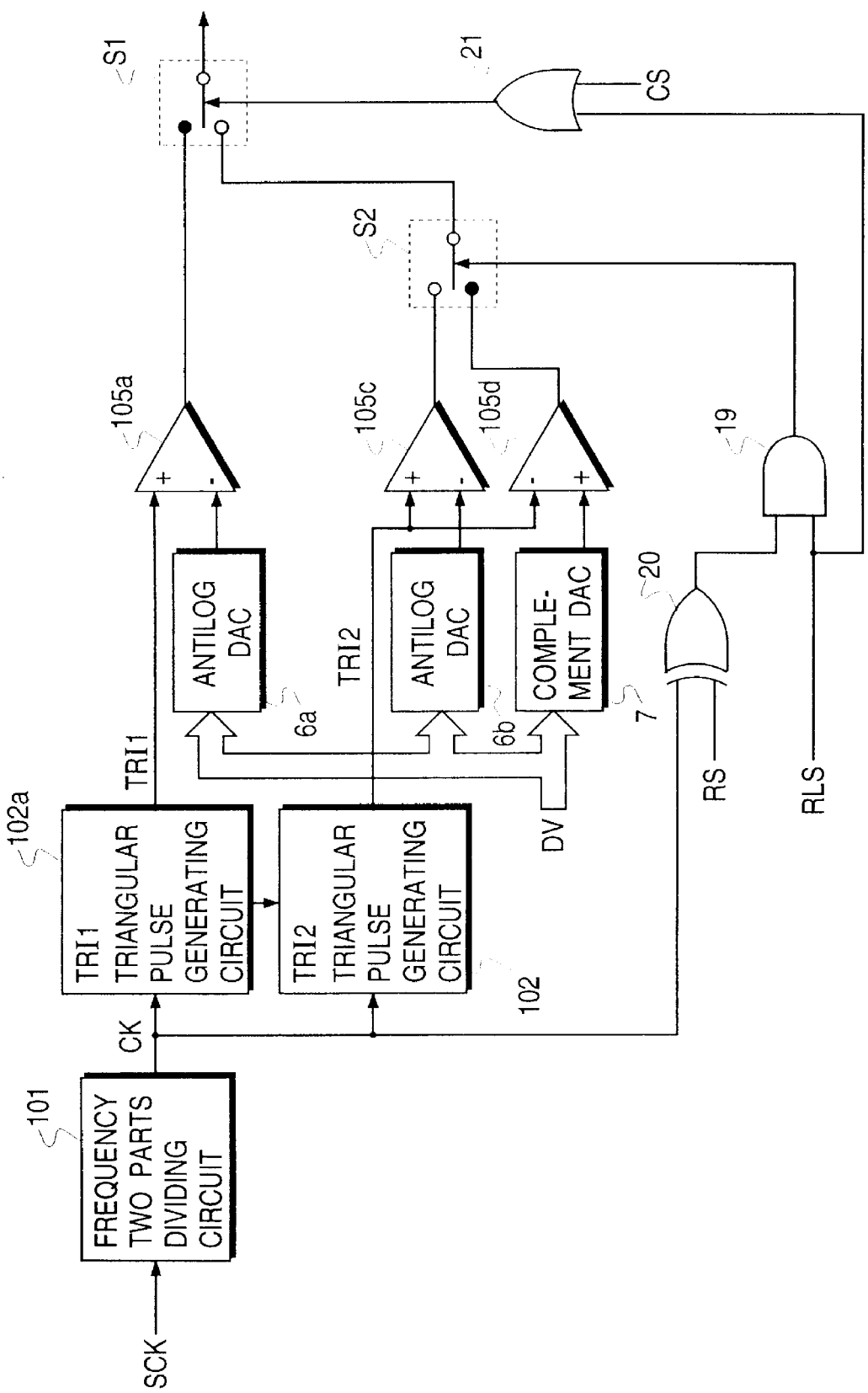
FIG. 18 is a block diagram showing an example of the arrangement of the third embodiment of the present invention.

The third embodiment of the present invention will be described below. FIG. 18 is a block diagram showing the arrangement of the third embodiment. The same reference numerals in this embodiment denote the same parts as in the above embodiments, and a description thereof will be omitted. The arrangement of the third embodiment is different from that of the second embodiment in that the arrangement, of the triangular pulse generating circuit 102a, which is associated with complement selection is omitted, and the control circuit 104 is replaced with logic circuits 19 to 21. Such different points will be mainly described below.

Figure 19:
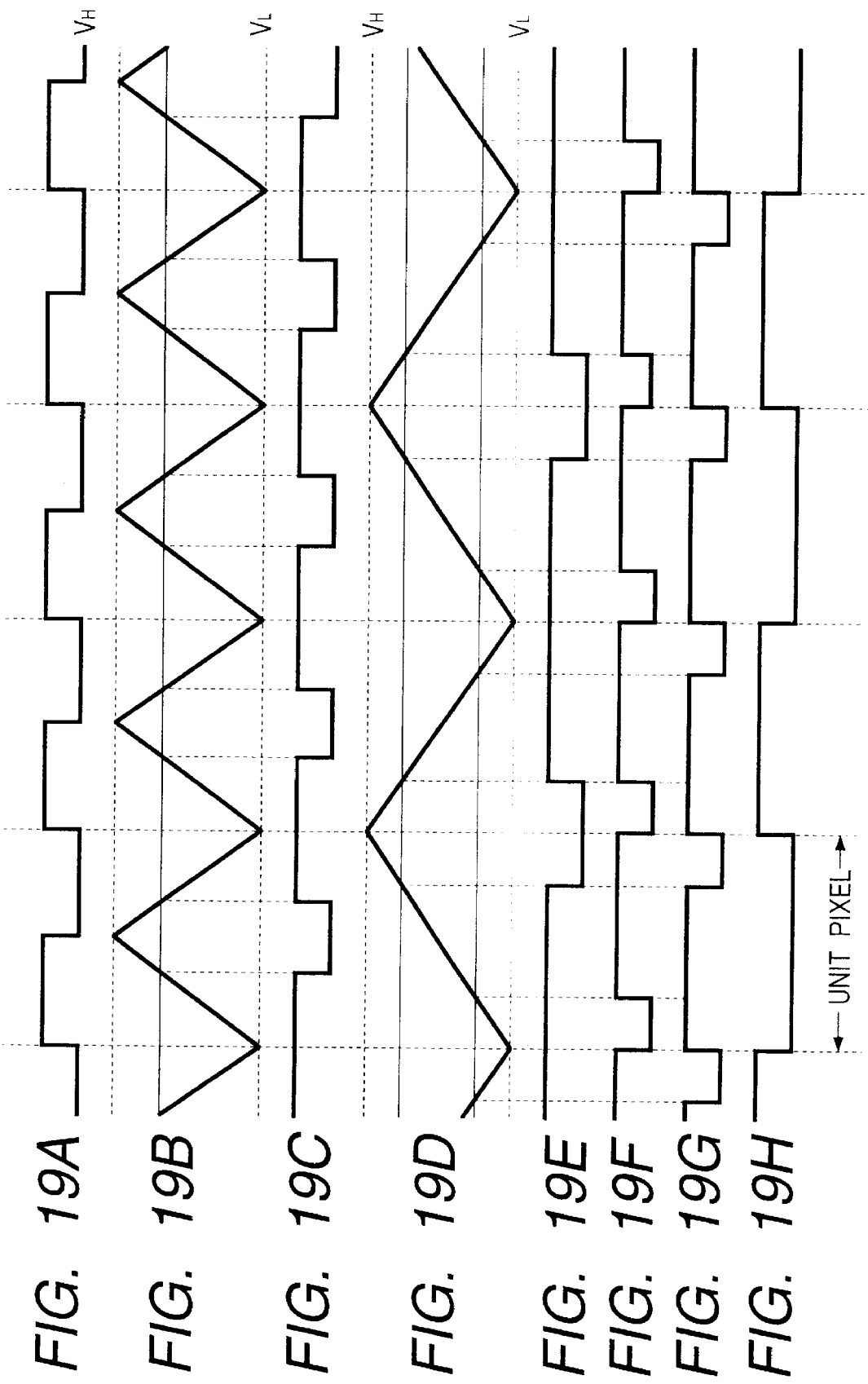
FIGS. 19A to 19H are timing charts for explaining the operation of the circuit in FIG. 26.

The system shown in FIG. 18 uses signals CS, RLS, and RS for output selection. When both the signals RLS and CS are at L level, an output from the OR circuit 21 is set at L level, and a switch S1 selects an output from a comparator 105a. With this comparator output, a 1x central growth output like the one shown in FIG. 19C, whose pulse width changes with respect to the center of one period (one pixel) of a clock SCK, can be obtained. FIGS. 19A and 19B respectively show the clock SCK and a triangular pulse TRI1. An output from each of antilog DACs 6a and 6b is set such that its level becomes almost the same as a level VH of the triangular pulse when input data DV is at the lowest level, and becomes almost the same as a level VL when the input data is at the highest level. A complement DAC 7 is set to operate oppositely to these DACs 6a and 6b.

When the signals RLS and CS are at H level, an output from the AND circuit 19 is set at L level, and a switch S2 selects an output from a comparator 105c. An output from the OR circuit 21 is set at H level, and the switch S1 selects an output from the switch S2. With the comparator output based on this triangular pulse TRI2 and the output from the antilog DAC 106b, the 2x central growth output shown in FIG. 19E, whose pulse width changes with respect to the center of a pixel in units of two pixels, can be obtained. FIG. 19D shows the triangular pulse TRI2.

In addition, by using the triangular pulse TRI2, the antilog DAC 6a, the complement DAC 7, the comparators 105c and 105d, the switches S1 and S2, the logic circuits 18, 20, and 21, a left growth output whose pulse width changes with respect to the left end of one pixel can be obtained, together with a right growth output whose pulse width changes with respect to the right end of one pixel. The processing of obtaining right and left growth outputs will be described below.

When a left growth pulse is to be output, the signals RLS and RS in FIG. 18 are respectively set at H level and L level, and a switching signal like the one shown in FIG. 19H, which is formed from the clock SCK and has a period twice that of the clock SCK, is input as the signal CK. The switch S2 is controlled by logical operations between the signals CK, RS, and RLS. Assume that the slopes of the leading and trailing edges of a triangular pulse are respectively represented by odd and even number pixels. In this case, when left growth control is to be performed, the switch S2 is controlled by the pulse shown in FIG. 19H such that a negative pulse from the complement DAC 7 is selected on the odd number pixel side of the triangular pulse TRI2, and a positive pulse from the antilog DAC 6b is selected on the even number pixel side. As a result, the left growth pulse shown in FIG. 19F is output.

When a right growth pulse is to be output, both the signals RLS and RS are set at H level to control the switch S2 by using a pulse obtained by inverting the pulse in FIG. 19H. The switch S2 operates in the opposite manner to that in left growth control. Therefore, a positive pulse from the antilog DAC is output on the odd number pixel side, and a negative pulse from the complement DAC is output ont he even number pixel side, thereby generating the right growth pulse shown in FIG. 19G.

Assume that an original image like the one shown in FIG. 2A is to be reproduced by using right and left, and central growth outputs, as in the first embodiment. In this case, if dots are actually drawn in accordance with a PWM output, the resultant output almost becomes the image shown in FIG. 10A.

Fourth Embodiment

In the third embodiment, in order to obtain a $1x$ central growth output having the same period as that of the input signal SCK, a triangular pulse having the same period as that of the signal SCK is used. In order to obtain a $2x$ central output and $1x$ right and left growth outputs other than the $1x$ central growth output, a triangular pulse having a period twice that of the signal SCK is used. In this case, as described above, in order to obtain a stable triangular pulse, very accurate circuit control is required, resulting in a large-scale circuit. Using two such circuits is not preferable in consideration of the fact that the chip area directly influences the cost in manufacturing an IC.

Figure 21A:
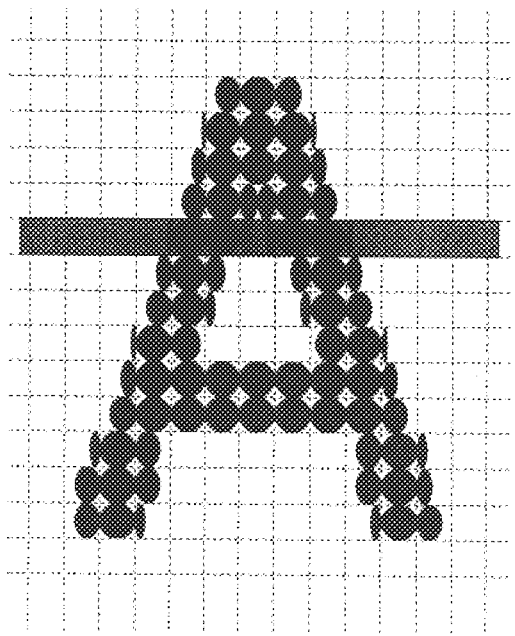
FIGS. 21A and 21B are views for explaining an image recording operation using the circuit in FIG. 27.
Figure 21B:
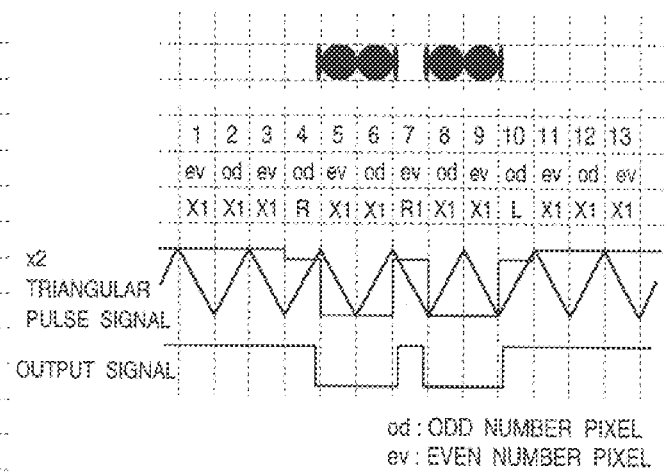

In addition, in the third embodiment, since only the central growth mode or the right/left growth mode can be selected, no dot can be drawn on a portion like the pixel in the middle of a line immediately above the screen mesh in FIG. 21B. For this reason, a reproduction output which is completely faithful to the original image may not be obtained.

The fourth embodiment will be described below. In this embodiment, only a triangular pulse having a period twice that of a signal SCK is used, and both antilog and complement DACs are used. In addition to $1x$ central growth, growth from two ends within each pixel (intrapixel right and left growth) can be realized by using only a triangular pulse having a period twice that of the signal SCK in such a manner that right and left growth pulses are added within a clock SCK1, and at the same time a $2x$ central growth output and $1x$ right and left growth outputs can be obtained as in the prior art.

Figure 20:
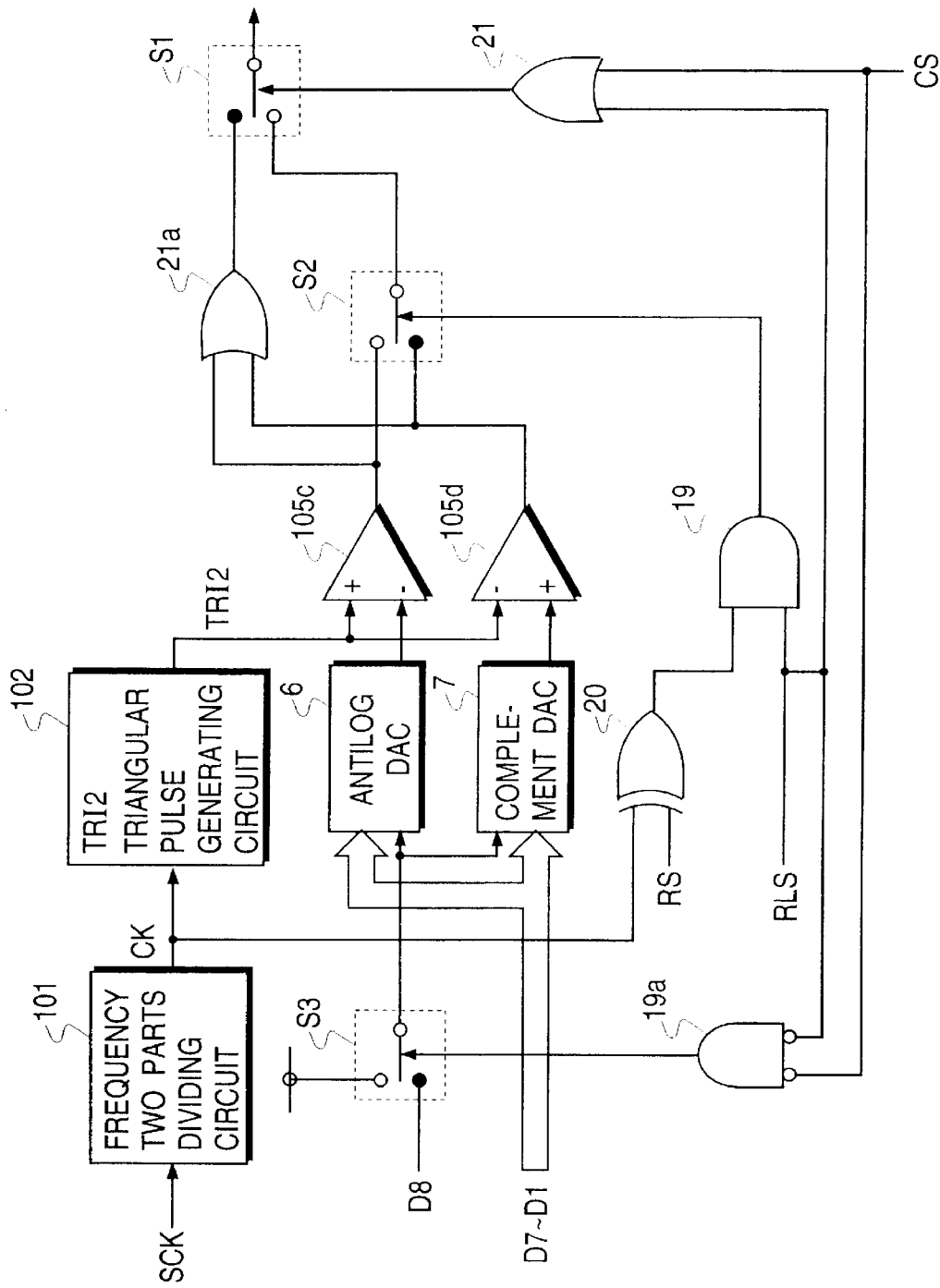
FIG. 20 is a block diagram showing an example of the arrangement of the fourth embodiment of the present invention.

FIG. 20 shows the fourth embodiment of the present invention. This system comprises switches S1, S2, and S3, an antilog DAC 6, a complement DAC 7, comparators 105c and 105d, logic circuits 19, 19a, 20, 21a, and 21b, a frequency two parts dividing circuit 101, and a triangular pulse generating circuit 102. The system is designed to obtain a $1x$ central growth output, a $2x$ central growth output, a $1x$ left growth output, and a $1x$ right growth output by using a triangular pulse TRI2 formed from a signal having a period twice that of an input signal SCK.

Selection of each signal is determined by the states of signals CS, RLS, and RS in FIG. 20. When both the signals CS and RLS are at L level, $1x$ central growth data is output. When the signal CS is at H level and the signals RLS and RS are at L level, respectively, $2x$ central growth data is output. When the signals RLS and RS are at H level and L level, respectively, $1x$ left growth data is output. When both the signal RLS and RS are at H level, $1x$ right growth data is output.

Figure 23:
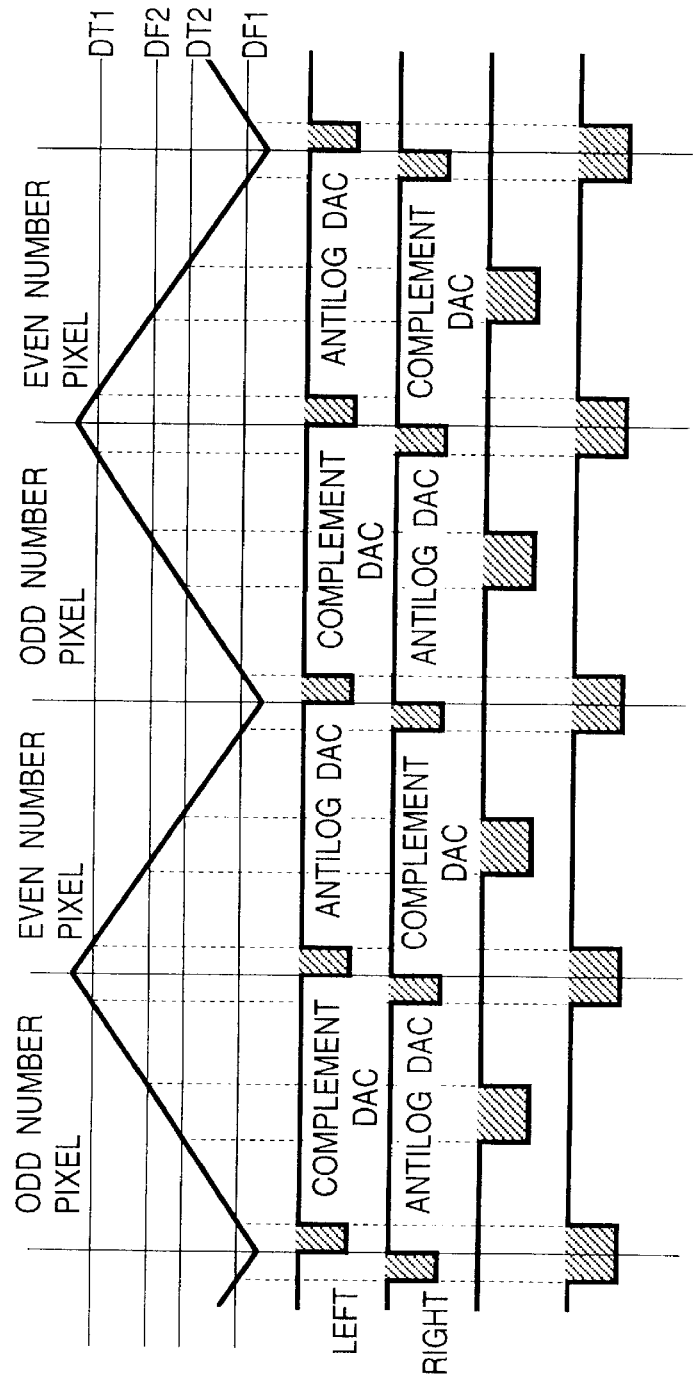
FIGS. 23A to 23E are timing charts for explaining the operation of the fifth embodiment.

The manner of switching the antilog and complement DACs 6 and 7 in the right and left growth modes will be described below. Assume that the switch S3 in FIG. 20 is operated to input data D8 to both the DACs 6 and 7, while data DT1 is an output from the antilog DAC, and data DF1 is an output from the complement DAC. In the left growth mode, the complement DAC is used for the odd number pixel side of the triangular pulse, and a negative pulse based on the comparison between the complement DAC output and the triangular pulse is output as a comparator output, whereas the antilog DAC is used for the even number pixel side, and a positive pulse based on the comparison between the antilog DAC output and the triangular pulse is output as a comparator output (FIG. 23B). In contrast to this, in the right growth mode, the antilog DAC is used for the odd number pixel side, and the complement DAC is used for the even number pixel side, and outputs like those shown in FIG. 23C are obtained.

The following is the process of outputting $1x$ central growth data by using this circuit block. When the $1x$ central growth output mode is selected, the switch S1 is connected to an OR 21. The switch S3 is connected to the power supply side to keep input data D8 at H level. Since the data D8 is connected to the power supply, when the same data as those in the left/right growth mode are input as data D7 to D1, DAC outputs DT2 and DF2 in FIG. 23A are obtained. When these DACs are simultaneously used, and their outputs are ORed, $1x$ central growth data can be output by using the triangular pulse TRI2 having a period twice that of the signal SCK, as shown in FIG. 23B.

In the $2x$ central growth, $1x$ left growth, and $1x$ right growth output modes, the switch S1 operates to select the switch S2 side, and the data D7 to D1 and the data D8 selected by the switch S3 are input to the antilog and complement DACs 6 and 7. In addition, as the signal CK, the signal shown in FIG. 19H is input. With these data and signal, the same operation as that in the third embodiment is performed.

By obtaining the respective modulation outputs using one triangular pulse in this manner, only one triangular pulse generating circuit is required, and a reduction in circuit scale can be realized, while almost the same operation as that in the third embodiment can be performed. In this case, however, only seven lower bits of input data are used in the $1x$ central growth output mode. Although each pixel is very small, a deterioration in precision may occur as compared with the third embodiment.

Fifth Embodiment

Figure 22:
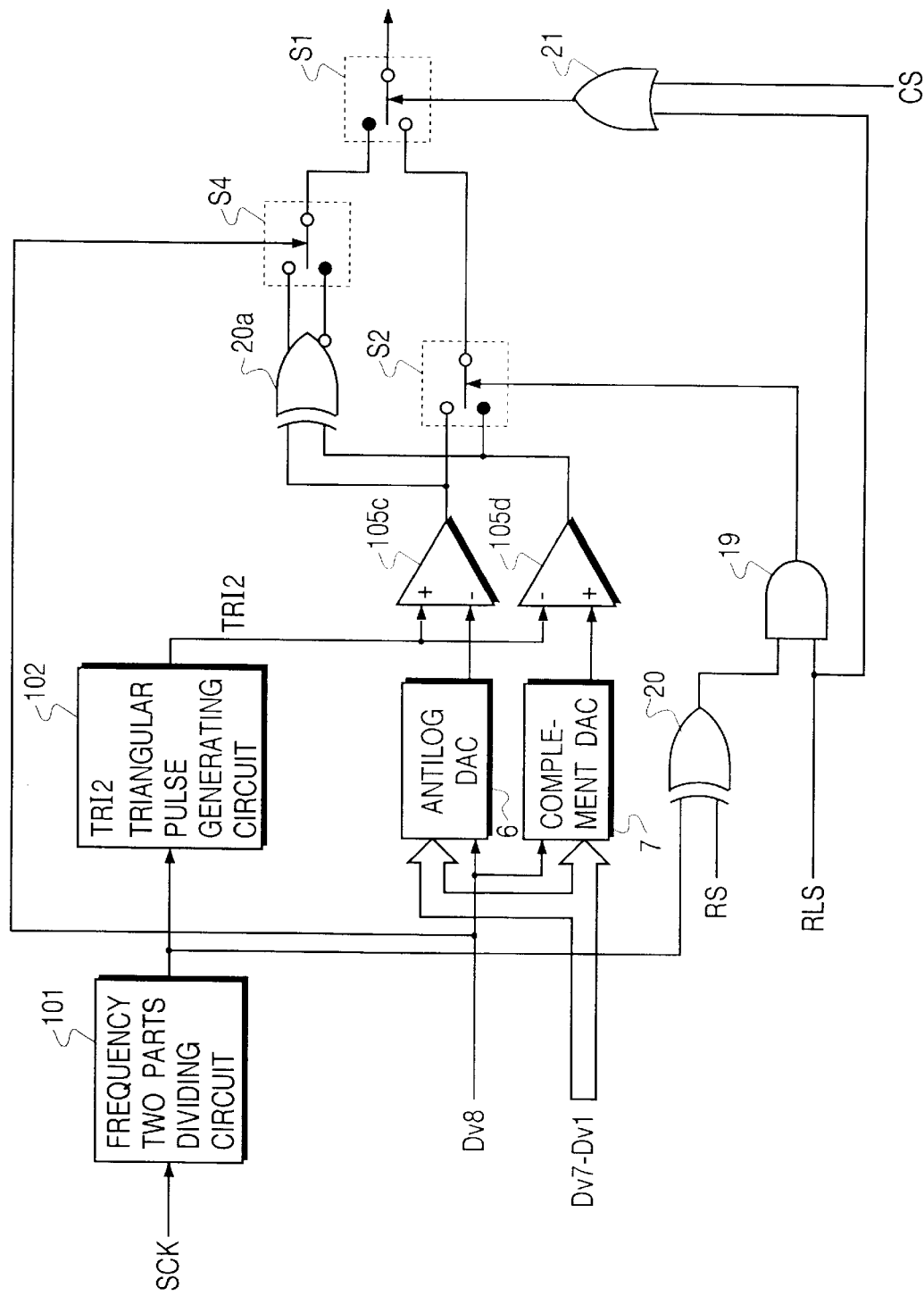
FIG. 22 is a block diagram showing the circuit arrangement of the fifth embodiment of the present invention.

FIG. 22 is a block diagram showing a modulation circuit capable of performing pulse width growth from the right and left ends of each pixel (intrapixel right and left growth) in a 1x pixel modulation mode by using a triangular pulse TRI2 having a period twice that of an input clock SCK. This system comprises switches S1, S2, and S4, an antilog DAC 6, a complement DAC 7, comparators 105c and 105d, logic circuits 19, 20, and 21, a frequency two parts dividing circuit 101, and a triangular pulse generating circuit 102.

In the 1x growth output mode, data D8, which is not used in the first embodiment, is used for a switch for switching the central growth mode and the intrapixel right and left growth mode. When the data D8 is at H level, the central growth mode is selected. When the data D8 is at L level, the intrapixel right and left growth mode is selected. In order to output central growth data in the 1x growth mode, signals CS and RLS are set at L level, the switch S1 operates to select the switch S4 side. In addition, if the data D8 is set at H level, the switch S4 operates to select the positive side of an EX_OR, and D8=H is input to the antilog and complement DACs 5 and 6. As a result, the same operation as that in the first embodiment is performed.

When right and left growth data within a pixel is to be output, the data D8 is set at L level, and the same data D7 to D1 as those in the first embodiment are input. As a result, the antilog DAC output becomes an output DT1 in FIG. 23A, and the complement DAC output becomes an output DF1 in FIG. 23A. Since D8=L, the switch S4 operates to select the negative side of the EX_OR in FIG. 22. The output shown in FIG. 23E can therefore be obtained by calculating the EX_NOR between a positive pulse as a comparator pulse based on an output from the antilog DAC 6 and the triangular pulse and a negative pulse as a comparator output based on an output from the complement DAC 7 and the triangular pulse.

With this operation, an original image like the one shown in FIG. 2A can be reproduced with a higher resolution than in the prior art. FIG. 21A shows an image reproduced by using both the intrapixel right and left growth mode and the central growth mode. FIG. 21B shows a PWM output pulse in this case. As indicated by the screen mesh in FIG. 21A, by using the intrapixel right and left growth mode, finer control can be performed, and a reproduced image more faithful to an original image can be output.

Sixth Embodiment

Figure 24:
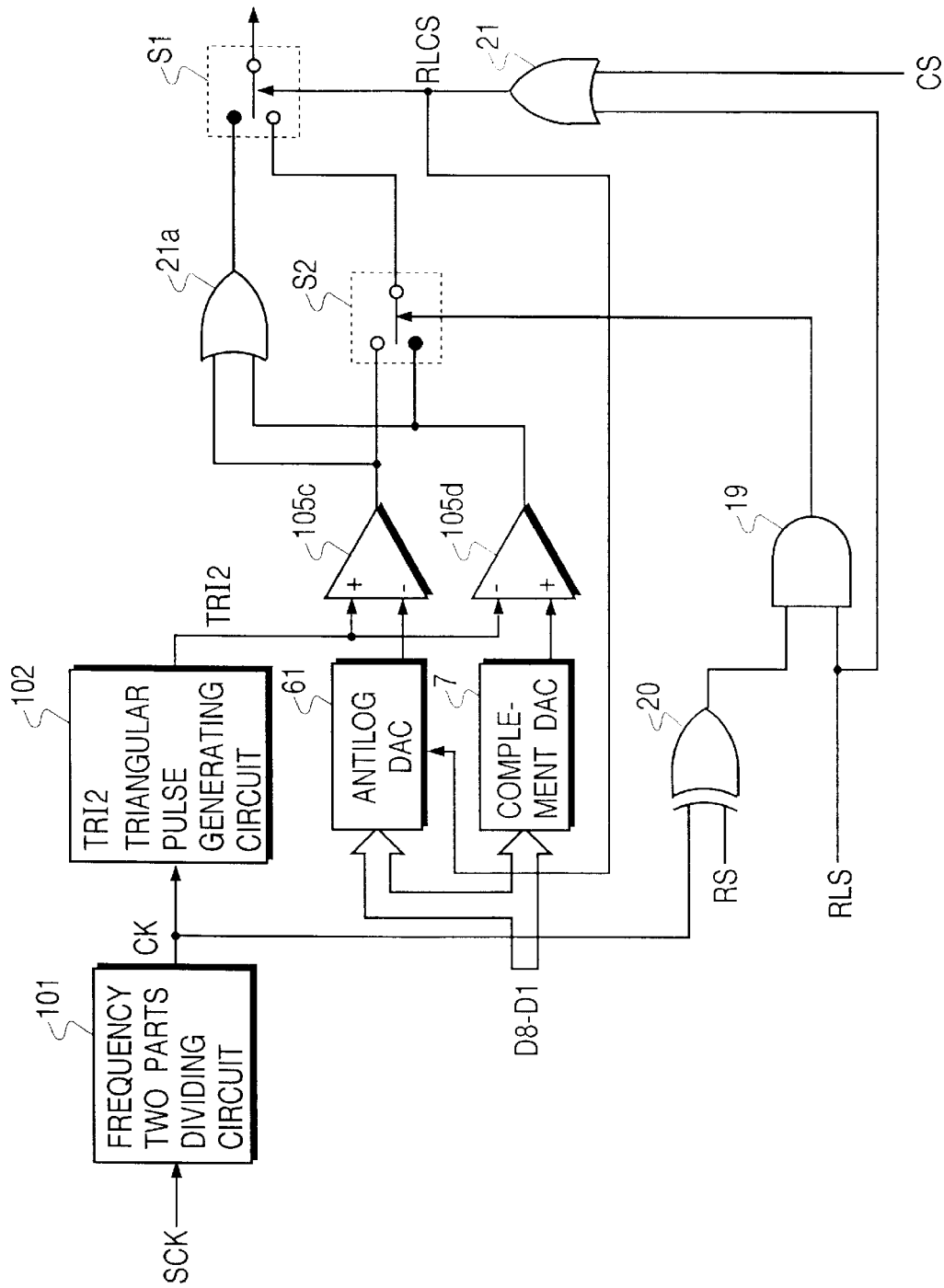
FIG. 24 is a block diagram showing the circuit arrangement of the sixth embodiment of the present invention.

FIG. 24 shows the sixth embodiment of the present invention. This system comprises switches S1 and S2, an antilog DAC 61, a complement DAC 7, comparators 105c and 105d, logic circuits 19, 20, and 21, a frequency two parts dividing circuit 101, and a triangular pulse generating circuit 102. This embodiment is the same as the fourth embodiment except that the resolution in the 1x central growth mode is set to eight bits.

Figure 25:
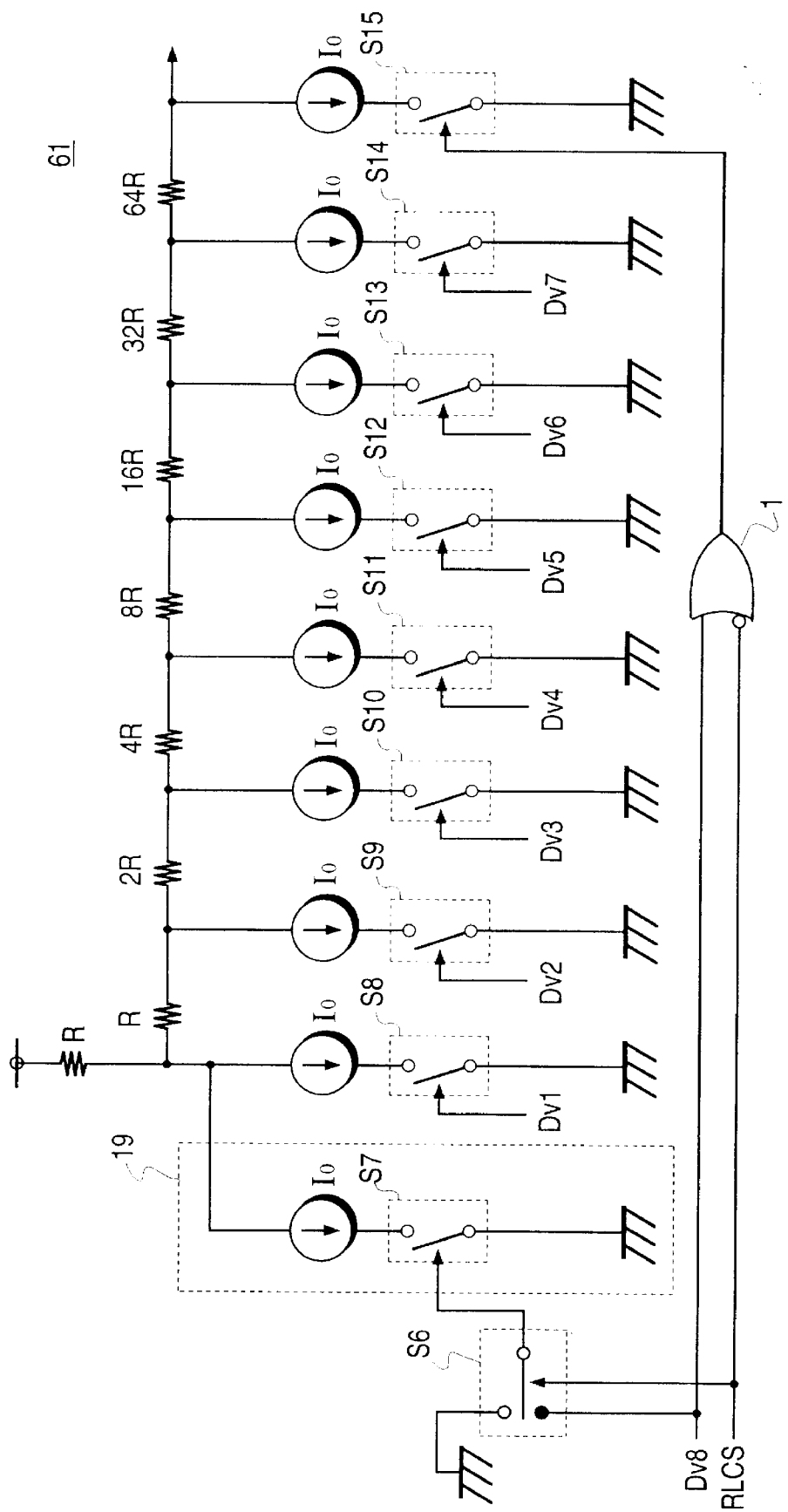
FIG. 25 is a circuit diagram showing an antilog DAC 6.

When both signals RS and CS are at L level, each of input data D8 to D1 is shifted from corresponding original data by one bit as follows. A value which should be input to D1 is input to D8, a value which should be input to D2 is input to D1, and a value which should be input to D3 is input to D2. These data are then input to the antilog and complement DACs. At this time, in addition to the data D8 to D1, an OR output RLCS based on the output from the switch S1 and the signal CS is input to the antilog DAC. FIG. 25 shows an example of the arrangement of this DAC. In this circuit, when RLCS=L, a switch S7 of a current source 19 added to the least significant bit is opened/closed in accordance with the data D8. In addition, a switch S15 of the current source added to the most significant bit is kept closed by the OR 19. When a mode other than the 1x central growth mode is set, i.e., RLCS=H, the AND 21 is set at L level by a switch S6, and a switch S7 is kept open. The data D8 is input to a switch S15 without any change.

Figure 26:
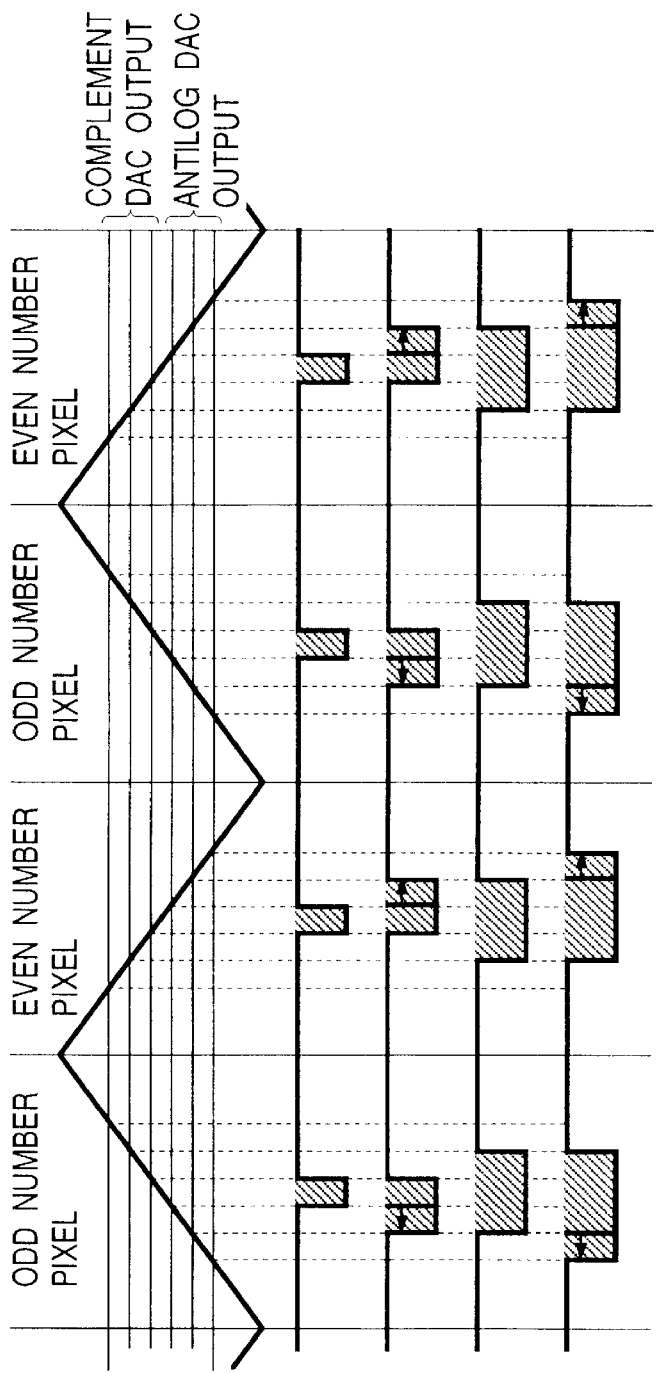
FIGS. 26A to 26E are timing charts for explaining the operation of the sixth embodiment.

When even number data are input to inputs D8 to D1 with respect to odd number pixels of the triangular pulse in FIG. 26A, the data D8 to the antilog DAC is set at L level, and the switch S7 is opened. Since the complement DAC operates in the same manner as in the prior art, when the outputs from the two DACs are compared, and their OR is calculated, odd number pixel portions like those shown in FIGS. 26B and 26D are obtained.

When even number data are input to the inputs d8 to D1 with respect to even number pixels, since D8=L is input to the antilog DAC, the switch S7 is kept open. Since the complement DAC undergoes no change, when the outputs from the two DACs are compared, and their OR is calculated, even number pixel portions like those shown in FIGS. 26B and 26D are obtained. With these operations, final outputs like those shown in FIGS. 26B and 26D are obtained.

Assume that the previous input data is incremented by one to become odd number data. In this case, as is apparent from the manner of inputting the input data, the values of the data D7 to D1 remain the same as those in the previous state. When D8=H is input to the antilog DAC with respect to an odd number pixel, the switch S7 is closed. As a result, the data corresponding to the least significant bit increases. Since the complement DAC operates in the same manner as in the prior art, when the outputs from the two DACs are compared, and their OR is calculated, odd number pixel portions like those shown in FIGS. 26C and 26E are obtained.

When odd number data are input to the inputs D8 to D1 with respect to even number pixels, since D8=H is input to the antilog DAC, the switch S7 is closed. Since the complement DAC undergoes no change, when the outputs from the two DACs are compared, and their OR is calculated, final outputs like those shown in FIGS. 26C and 26E are obtained.

In the 2x central growth, 1x left growth, and 1x right growth modes, when data are input in a normal manner, and the signals CS, RS, RLS, and TS1 are input in the same manner as in the first embodiment, outputs in the respective modes can be obtained.

As described above, even in the 1x central growth mode, pulse width modulation can be performed with almost the same circuit arrangement without a deterioration in precision. In this case, however, only when input data is odd number data, the pixel center is shifted by one LSB. Since this value is very small, no practical problem is posed.

Seventh Embodiment

Figure 27:
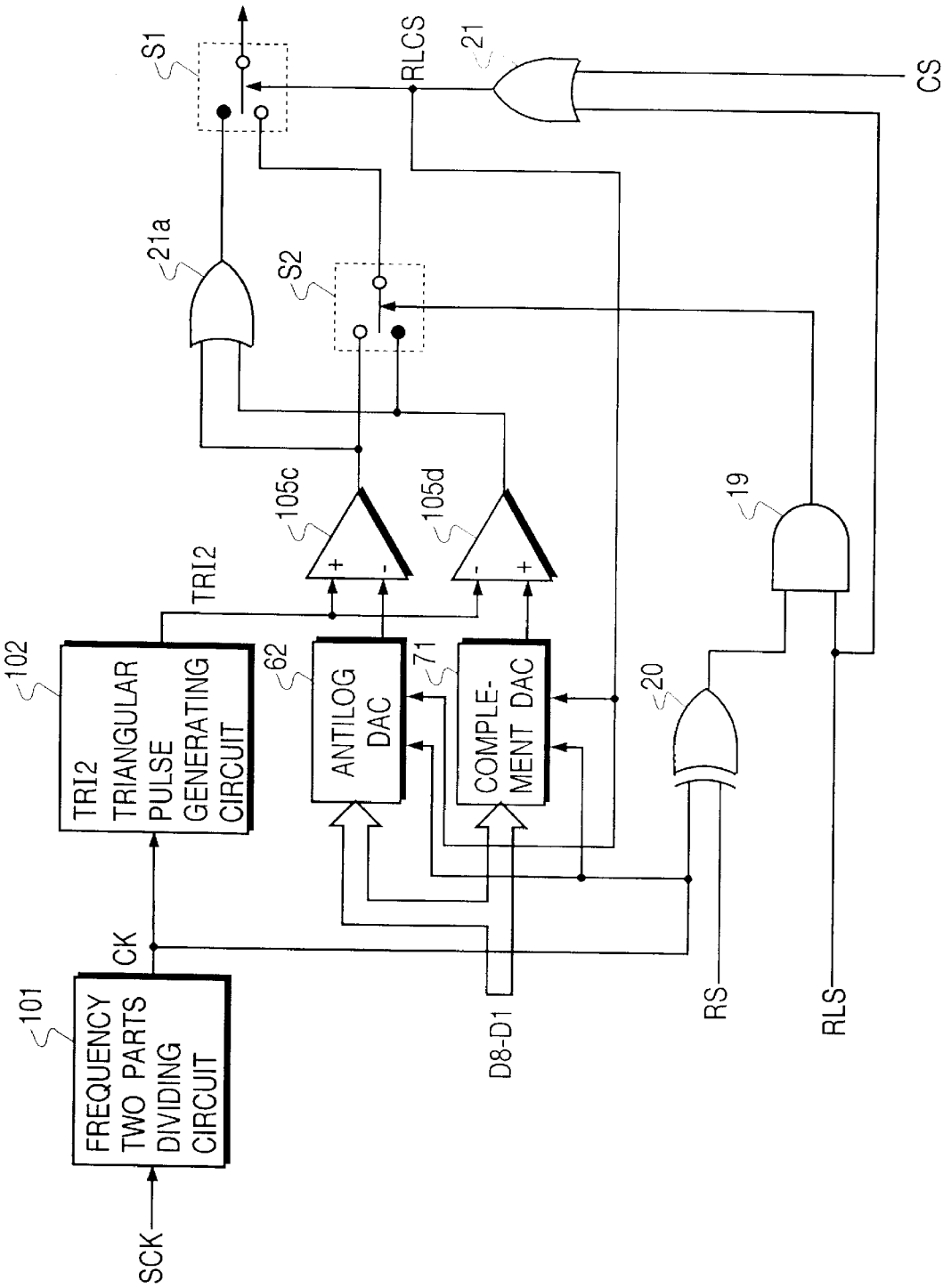
FIG. 27 is a block diagram showing the circuit arrangement of the seventh embodiment of the present invention.

FIG. 27 shows the seventh embodiment of the present invention. This system comprises switches S1 and S2, an antilog DAC 62, a complement DAC 71, comparators 105c and 105d, logic circuits 19, 20, and 21, a frequency two parts dividing circuit 101, and triangular pulse generating circuit 102. This embodiment is the same as the sixth embodiment of the present invention except that the offset between output pulse centers is set to 0.5 LSB in the 1x central growth mode.

Figure 28:
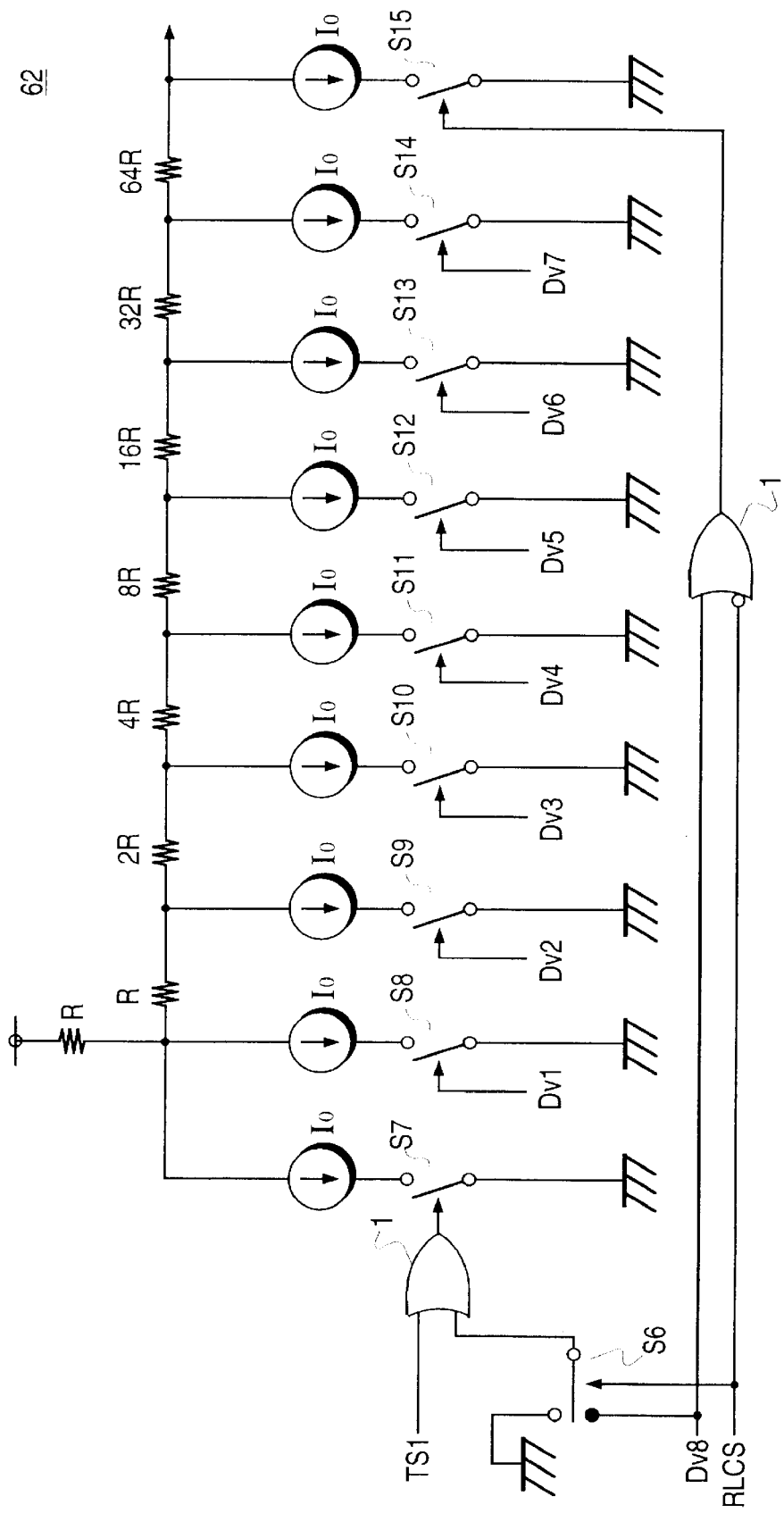
FIG. 28 is a circuit diagram showing an antilog DAC 62.
Figure 29:
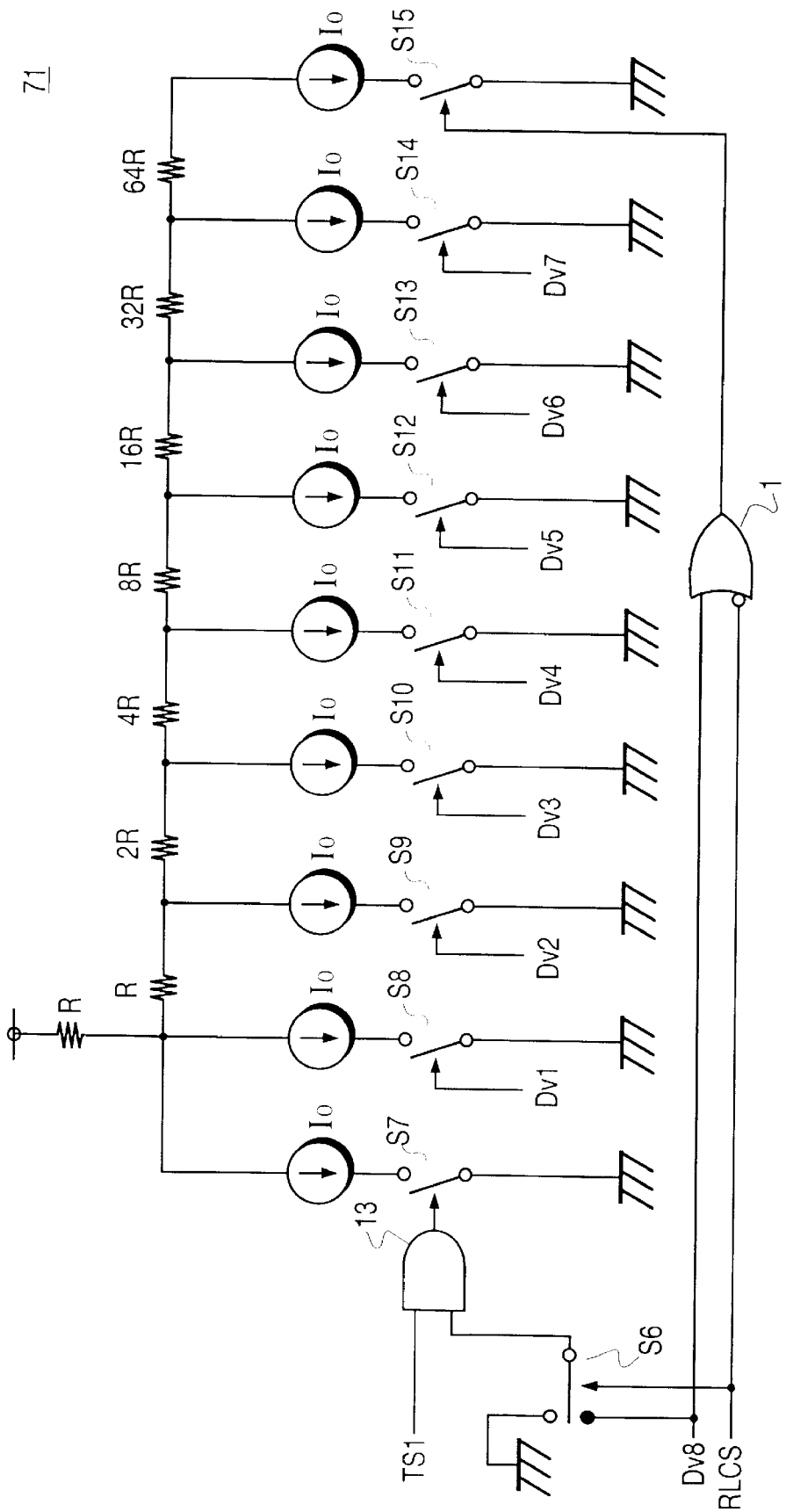
FIG. 29 is a circuit diagram showing a complement DAC 71.

Signals RS, RLS, and CS are input in the same manner as in the third embodiment. Since the 2x central growth, 1x left growth, and 1x right growth modes are the same as those in the sixth embodiment, only the 1x central growth mode will be described below. Assume that data are input to inputs D8 to D1 in the same manner as in the sixth embodiment. The arrangement shown in FIG. 27 differs from that shown in FIG. 24 in that signals TS1 and RLCS are input to both the antilog and complement DACs. FIG. 28 shows the antilog DAC. FIG. 29 shows the complement DAC. Each of the arrangements shown in FIGS. 28 and 29 differs from that shown in FIG. 25 in that an output from a switch S6 and the signal TS1 are used to perform a logic operation.

In the antilog DAC in FIG. 28, when RLCS=L, the data D8 and the signal CK are ORed. With this operation, the switch S7 is closed with respect to an odd number pixel (CK=L) of the triangular pulse when input data is odd number data (D8=H). The level of the DAC output is then raised by one bit (toward the FF side). With respect to an even number pixel (CK=H) of the triangular pulse, the switch S7 is kept closed, and the level of the DAC output is kept raised by one bit.

In the complement DAC in FIG. 29, when RLCS=L, the data D8 and the signal TS1 are ANDed. With this operation, the switch S7 is kept open with respect to an odd number pixel (CK=1) of the triangular pulse, and no change in DAC output occurs. With respect to an even number pixel (CK=H), only when input data is odd number data (D8=H), the switch S7 is closed, and the level of the DAC output is raised by one bit.

Figures 30A, 30B, 30C:
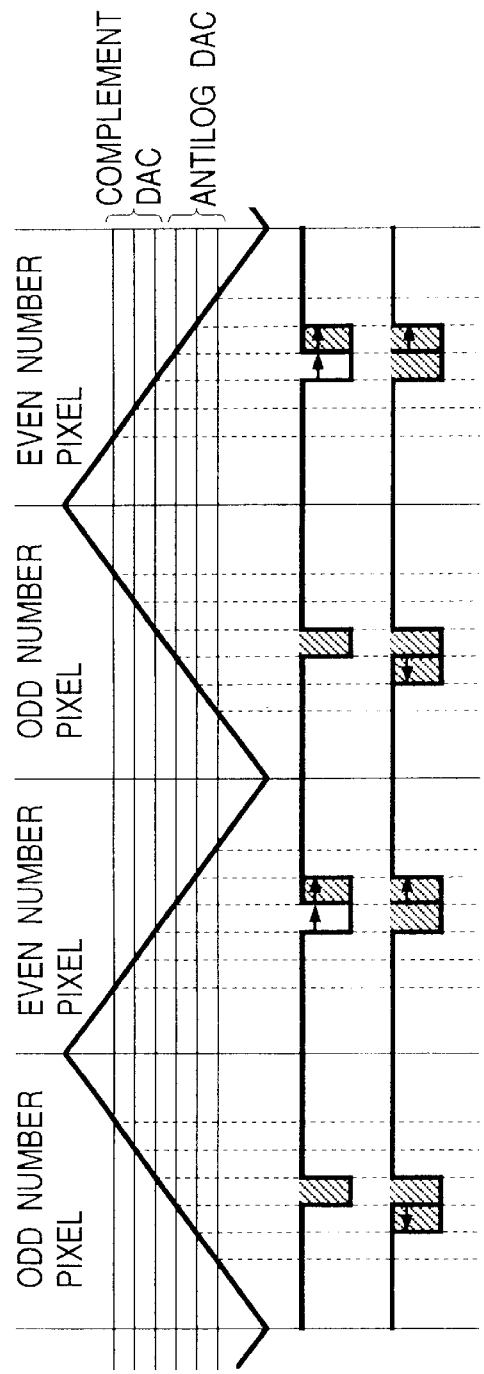
FIGS. 30A to 30C are timing charts for explaining the operation of the seventh embodiment.

With these operations, an output like the one shown in FIG. 30B is obtained as an output from the OR 19 in FIG. 27 when even number data is input with respect to the triangular pulse, and an output like the one shown in FIG. 30C is obtained when the input data is odd number data.

In this manner, 1x central growth data more accurate than that in the sixth embodiment can be output.

As has been described above, according to the fourth to seventh embodiments, since only one triangular pulse generating circuit is used, the circuit scale can be greatly reduced. In addition, by using the antilog and complement DACs simultaneously or separately, 1x central growth data, 1x intrapixel right and left 1x growth data, 1x left growth data, 1x right growth data, and 2x central growth data can be output. Furthermore, a circuit block capable of output high-precision data by selectively using these growth modes can be easily realized.

The present invention may be applied to a system constituted by a plurality of devices (e.g., a host computer, an interface device, a reader, and a printer) or an apparatus (e.g., a copying machine or facsimile apparatus) constituted by one device.

The present invention is not limited to the above embodiments, and various modifications can be made within the range defined by the appended claims.

What is claimed is:

1. A pixel modulation circuit for outputting a pulse signal having a pulse width corresponding to pixel data representing a gradation level of each pixel, comprising:

a first triangular pulse generating circuit for generating a periodic triangular pulse signal;

a complement and antilog output circuit capable of outputting a level signal corresponding to both antilog and complement values of pixel data; and a comparison circuit for comparing the triangular pulse signal with the level signal.

2. A circuit according to claim 1, wherein said complement and antilog output circuit comprises a D/A converter for outputting a level signal corresponding to both antilog and complement values of digital image data.

3. A circuit according to claim 2, wherein said comparison circuit comprises:

a first comparator for comparing the triangular pulse signal with a level signal corresponding to an antilog value of pixel data, and a second comparator for comparing the triangular pulse signal with a level signal corresponding to a complement value of the pixel data.

4. A circuit according to claim 3, further comprising switching means for selectively outputting outputs from said first and second comparators.

5. A circuit according to claim 1, wherein said complement and antilog output circuit comprises means for switching and outputting one of antilog and complement values of digital pixel modulation data as digital data, and D/A conversion means for converting the output digital data into an analog signal.

6. A circuit according to claim 5, further comprising a polarity switching circuit for switching a polarity of an output signal from said comparison circuit.

7. A circuit according to claim 1, wherein said triangular pulse generating circuit generates a triangular pulse signal whose one period corresponds to two pixels.

8. A circuit according to claim 7, further comprising a second triangular pulse generating circuit for generating a triangular pulse signal whose one period corresponds to one pixel.

9. A circuit according to claim 8, further comprising switching means for selectively outputting a pulse signal generated by using the triangular pulse signal from said first triangular pulse generating circuit and a pulse signal generated by using the triangular pulse signal from said second triangular pulse generating circuit.

10. A circuit according to claim 9, wherein said comparison circuit comprises:

a first comparator for comparing the triangular pulse signal with a level signal corresponding to an antilog value of pixel data, and a second comparator for comparing the triangular pulse signal with a level signal corresponding to a complement value of the pixel data, and second switching means for selectively outputting outputs from said first and second comparators.

11. A recording apparatus comprising:

means for inputting pixel data representing a gradation level of each pixel;

a first triangular pulse generating circuit for generating a periodic triangular pulse signal;

a complement and antilog output circuit capable of outputting a level signal corresponding to both antilog and complement value of input pixel data; and a comparison circuit for comparing the triangular pulse signal with the level signal.

12. An apparatus according to claim 11, wherein said complement and antilog output circuit comprises a D/A converter for outputting a level signal corresponding to both antilog and complement values of digital image data.

13. An apparatus according to claim 12, wherein said comparison circuit comprises:

a first comparator for comparing the triangular pulse signal with a level signal corresponding to an antilog value of pixel data, and a second comparator for comparing the triangular pulse signal with a level signal corresponding to a complement value of the pixel data.

14. An apparatus according to claim 13, further comprising switching means for selectively outputting outputs from said first and second comparators.

15. An apparatus according to claim 11, wherein said complement and antilog output circuit comprises means for switching and outputting one of antilog and complement values of digital pixel modulation data as digital data, and D/A conversion means for converting the output digital data into an analog signal.

16. An apparatus according to claim 15, further comprising a polarity switching circuit for switching a polarity of an output signal from said comparison circuit.

17. An apparatus according to claim 11, wherein said triangular pulse generating circuit generates a triangular pulse signal whose one period corresponds to two pixels.

18. An apparatus according to claim 17, further comprising a second triangular pulse generating circuit for generating a triangular pulse signal whose one period corresponds to one pixel.

19. An apparatus according to claim 18, further comprising switching means for selectively outputting a pulse signal generated by using the triangular pulse signal from said first triangular pulse generating circuit and a pulse signal generated by using the triangular pulse signal from said second triangular pulse generating circuit.

20. An apparatus according to claim 11, further comprising means for generating a laser beam which is modulated by an output signal.

21. A pixel modulation circuit for modulating a pulse width of an output signal by using an input clock signal and an input data signal, comprising:

a frequency dividing circuit for ½-frequency-dividing the input clock signal;

a triangular pulse generating circuit for generating a triangular pulse by using an output signal from said frequency dividing circuit;

an antilog D/A converter having an output signal corresponding to an antilog value of the input data signal; and a complement D/A converter having an output signal corresponding to a complement value of the input data signal, wherein said circuit has a first modulation mode of growing an output pulse width from a start point to an end point of an interval of the input clock, a second modulation mode of growing the output pulse width from the end point to the start point of the interval of the input clock in accordance with an input data signal, a third modulation mode of growing the output pulse width from the time center of the interval of the input clock in accordance with the input data signal, and a fourth modulation mode of growing the output pulse width from the time center of an interval twice the interval of the input clock in accordance with the input data signal.

22. A circuit according to claim 21, wherein said circuit has a fifth modulation mode of outputting a negative number of an output signal obtained in the third modulation mode.

23. A circuit according to claim 21, further comprising two current sources each capable of changing an output signal corresponding to a minimum bit change in said antilog D/A converter in accordance with a specific bit signal of an input data signal.

24. A circuit according to claim 22, further comprising two current sources each capable of changing an output signal corresponding to a minimum bit change in each of said antilog and complement D/A converters in accordance with a specific bit signal of an input data signal.

* * * * *